US011564192B2

(12) United States Patent
Otaka et al.

(10) Patent No.: US 11,564,192 B2
(45) Date of Patent: *Jan. 24, 2023

(54) BASE STATION, COMMUNICATION SYSTEM, COMMUNICATION METHOD, AND PROGRAM

(71) Applicant: Honda Motor Co., Ltd., Tokyo (JP)

(72) Inventors: Masaru Otaka, Wako (JP); Hideki Matsunaga, Wako (JP); Masamitsu Tsuchiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/178,112

(22) Filed: Feb. 17, 2021

(65) Prior Publication Data

US 2021/0176722 A1 Jun. 10, 2021

Related U.S. Application Data

(63) Continuation of application No. PCT/JP2019/014314, filed on Mar. 29, 2019.

(51) Int. Cl.
*H04W 56/00* (2009.01)
*H04B 17/364* (2015.01)
*H04W 64/00* (2009.01)
*H04W 72/04* (2009.01)

(52) U.S. Cl.
CPC ........ *H04W 56/006* (2013.01); *H04B 17/364* (2015.01); *H04W 64/003* (2013.01); *H04W 72/042* (2013.01)

(58) Field of Classification Search
CPC ............ H04W 56/006; H04W 64/003; H04W 72/042; H04W 64/00; H04W 36/24;
(Continued)

(56) References Cited

U.S. PATENT DOCUMENTS 9,538,435 B1\* 1/2017 Singh .................... H04W 72/04
2006/0205408 A1\* 9/2006 Nakagawa ............ H04W 88/02
370/335

(Continued)

FOREIGN PATENT DOCUMENTS

CN 107580757 A 1/2018
JP 2007515827 A 6/2007
(Continued)

OTHER PUBLICATIONS

International Search Report of related international application PCT/JP2019/014314, dated May 7, 2019.
(Continued)

*Primary Examiner* — Ashley Shivers
(74) *Attorney, Agent, or Firm* — Andrew Kefalonitis, Jr.; American Honda Motor Co., Inc.

(57) ABSTRACT

A base station that includes a memory for storing computer readable code and a processor operatively coupled to the memory is provided herein. The processor is configured to transmit, to a terminal apparatus, information associated with communication delays predicted for communication between the base station and the terminal apparatus. The terminal apparatus acquires the information associated with the communication delays from the base station.

18 Claims, 17 Drawing Sheets

(58) Field of Classification Search
CPC .... H04W 36/32; H04W 36/36; H04B 17/364; H04B 17/373
See application file for complete search history.

(56) References Cited

U.S. PATENT DOCUMENTS

| | | | |
|---|---|---|---|
| 2012/0071201 | A1 | 3/2012 | Chisaka |
| 2013/0229939 | A1 | 9/2013 | Teyeb et al. |
| 2015/0372729 | A1* | 12/2015 | Tajima ................. H04B 7/0478 375/267 |
| 2017/0111852 | A1 | 4/2017 | Selen et al. |
| 2017/0223742 | A1* | 8/2017 | Shimomura ...... H04W 74/0808 |
| 2018/0146410 | A1 | 5/2018 | Cho et al. |
| 2020/0052974 | A1* | 2/2020 | Yasuda ................. H04L 41/147 |
| 2020/0288417 | A1* | 9/2020 | Harada ............... H04W 72/044 |

FOREIGN PATENT DOCUMENTS

| | | | |
|---|---|---|---|
| JP | 2011010254 | A | 1/2011 |
| JP | 2012049914 | A | 3/2012 |
| JP | 2012049960 | A | 3/2012 |
| JP | 2016213655 | A | 12/2016 |
| JP | 2017216663 | A | 12/2017 |
| JP | 2018524844 | A | 8/2018 |
| JP | 2018148542 | A | 9/2018 |
| KR | 20180008585 | A | 1/2018 |
| WO | WO2005027557 | A | 3/2005 |
| WO | WO2010137314 | A | 12/2010 |
| WO | WO2012059131 | A | 5/2012 |
| WO | WO2016180497 | A | 11/2016 |

OTHER PUBLICATIONS

English Translation of International Search Report of related international application PCT/JP2019/014314, dated May 7, 2019.
Written Opinion of the International Searching Authority of related international application PCT/JP2019/014314, dated May 7, 2019.
Supplementary European search report for related European patent application EP19923480, dated Mar. 7, 2022.
Notice of Reasons for Refusal from Japan Patent Office for Japanese Patent Application No. 2021-511759, dated Aug. 22, 2022.

* cited by examiner

BASE STATION, COMMUNICATION SYSTEM, COMMUNICATION METHOD, AND PROGRAM

CROSS-REFERENCE TO RELATED APPLICATION

This application is a continuation of International Patent Application No. PCT/JP2019/014314 filed on Mar. 29, 2019 and titled Base Station, Communication System, Communication Method, and Program, the disclosure of which is hereby incorporated by reference in its entirety.

BACKGROUND

Remote operating technologies are known which allow an operator present in a remote location to operate a vehicle so as to move the vehicle. In remote operation, suppressing communication delays between an operator apparatus operated by the operator carrying out remote operation and a terminal apparatus equipped in a vehicle is desired.

A cellular wireless communication network in which a communication area has been deployed throughout an area may be used for the communication of vehicle driving control, such as remote operation. However, since the terminal apparatus equipped in the vehicle moves in accordance with the movement of the vehicle, it may be difficult to maintain the connection via a single base station. Thus, the terminal apparatus may carry out a handover process for switching a connection from a connected base station to another base station in a timely manner in order to maintain the connection to the network and/or the connection to the operator apparatus.

SUMMARY

In one aspect, a base station is provided. The base station includes a memory for storing computer readable code and a processor operatively coupled to the memory. The processor is configured to transmit, to a terminal apparatus, information associated with communication delays predicted for communication between the base station and the terminal apparatus.

In another aspect, a communication system including a base station and a terminal apparatus is provided. The base station is configured to transmit a notification signal to the terminal apparatus, the notification signal including information on communication delays predicted for communication between the base station and the terminal apparatus. The terminal apparatus is configured to receive the information on the communication delays from the base station.

In yet another aspect, a computer-implemented communication method performed by a base station is provided. The communication method including transmitting, to a terminal apparatus, information associated with a communication delay predicted for communication between the base station and the terminal apparatus.

BRIEF DESCRIPTION OF THE DRAWINGS

The accompanying drawings are included in the specification and constitute a part thereof, illustrating embodiments of the present disclosure, and, together with the description, are used to explain the principles of the disclosure.

DETAILED DESCRIPTION

Figure 1:
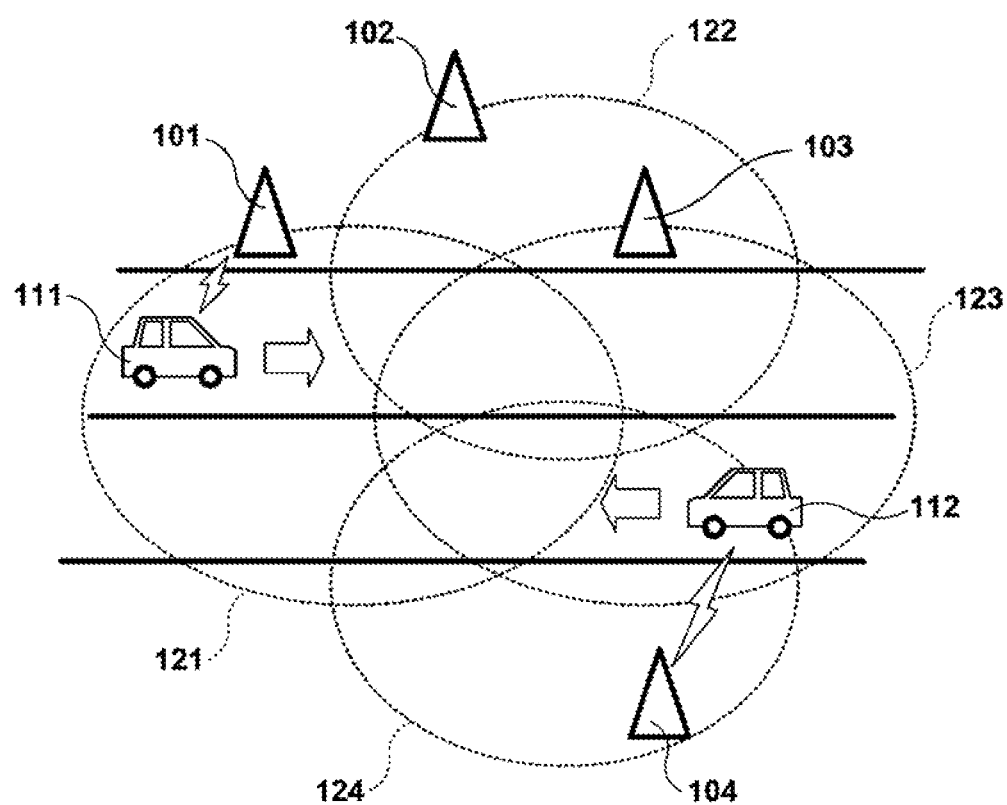
FIG. 1 is a diagram of an exemplary communication system.

The embodiments will be described in detail below with reference to the accompanying drawings. Note that the following embodiments are not intended to limit the disclosure according to the claims and all the combinations of the features described in the embodiments are not essential to the disclosure. Two or more features of the multiple features described in the embodiments may optionally be combined. In addition, the same reference numerals are assigned to the same or similar configurations, with redundant descriptions thereof omitted.

The present disclosure is generally related to wireless communication, and more specifically, to controlling handover of communication between base stations and terminals.

FIG. 1 illustrates an exemplary embodiment of a communication system. The communication system is, for example, a cellular wireless communication system that may include base stations 101 to 104 and terminal apparatuses 111 and 112. The base stations 101, 102, 103, and 104 form cells 121, 122, 123, and 124, respectively, and connect to the terminal apparatus in the cell formed by the base station to carry out wireless communication. For example, the terminal apparatus carries out wireless communication in connection with any of the base stations forming cells that cover the position of the terminal apparatus. That is, the cell may be disposed so as to overlap other cells in at least a portion of the cell, and in the overlapping area, the terminal apparatus may connect to the base station forming any of the cells. In one example, the base stations 101 to 104 and the terminal apparatuses 111 and 112 may be a base station (gNodeB) and a terminal of a fifth generation (5G) cellular communication system. In another example, the base stations 101 to 104 and the terminal apparatuses 111 and 112 may be a base station and a terminal corresponding to LTE (long term evolution) or other generation of cellular communication standards. The base stations 101 to 104 may be a base station directly connected to a core network (for example, an evolved packet core (EPC)) or a relay station wirelessly connected to another base station. Note that the cellular wireless communication system is an example, with other wireless communication systems capable of being used. For example, a wireless LAN may be used. In this case, in the following description, the base station may be replaced with an access point of the wireless LAN, while the terminal apparatus may be replaced with a station of the wireless LAN.

In the present embodiment, an example will be described in which a terminal apparatus equipped in a vehicle carries out driving control of the vehicle by carrying out wireless communication, such as remote operation. However, this is merely an example, with any terminal apparatus having wireless capability that can be connected to a cellular communication network such as a smart phone, a mobile phone, a personal computer, or the like capable of being used. In general, while one base station may form multiple cells, in the present embodiment, an example is given in which one base station forms a single cell. In the following description, when the base station transmits information to the terminal apparatus, the information may be transmitted for each cell. In other words, when the base station forms multiple cells, multiple information transmissions may be carried out for each cell.

In the example of FIG. 1, the terminal apparatus 111 is in range of the cell 121 formed by the base station 101, with a case illustrated in which the terminal apparatus 111 is operatively connected to the base station 101 to carry out wireless communication. Further, in the example of FIG. 1, the terminal apparatus 112 is in range of the cell 124 formed by the base station 104, with a case illustrated in which the terminal apparatus 112 is operatively connected to the base station 104 to carry out wireless communication. Although the position of the terminal apparatus 112 is also within the range of the cell 123 formed by the base station 103, the terminal apparatus 112 may connect to the base station 104 due to, for example, a quality of the wireless signals from the base station 104 being higher than a quality of the wireless signals from the base station 103.

In the present embodiment, as the selection criteria for a base station to which a connection is made, instead of or in addition to wireless quality, the communication delay with a communication partner apparatus such as an operator apparatus operating by a remote operating operator (not illustrated) is used. In other words, the terminal apparatus is configured to connect to a base station corresponding to a path in which communication delays are sufficiently reduced. To this end, the base station according to the present embodiment notifies the terminal apparatus of information indicating the actual measured communication delay obtained when another terminal apparatus connected to and communicated with the base station in the past. As a result, when the terminal apparatus is connected to and communicating with the base station, the base station notifies the terminal apparatus of the amount of a predicted communication delay that is "predicted" based on past actual measured values. The information indicating this communication delay may be, for example, information indicating a statistic such as the average value, standard deviation, mode value of an actual value of a past communication delay, or may be the maximum value of the past communication delay. The information indicating the communication delay may indicate a value obtained by multiplying the maximum value of the past communication delay by a predetermined multiplier, or alternatively, may indicate a predetermined value when the maximum value exceeds the predetermined value. That is, the information indicating the communication delay may be information indicating a value based on the maximum value of the past communication delay. The information indicating the communication delay may be information indicating a value that has a large effect on the value of the actual measured communication delay close to the present and a small effect on the value of the actual measured communication delay going back in the past. For example, for a number of actual measured values, the weighted average value obtained by multiplying and adding a coefficient that becomes smaller as the time difference between the time when the actual measurement value was acquired and the current time becomes larger may be provided as information indicating the communication delay. Additionally, the actual measured communication delay may be classified by, for example, a day of the week, a time of day, and the like. This is because, for example, the number of vehicles that use vehicle driving control technology which utilizes communication such as remote operation can vary greatly and the magnitude of the communication delay also varies greatly between the day of the week and the time of day when congestion is likely to occur and the other days of the week and times of day. In this case, the base station can determine information to be transmitted that indicates the communication delay, depending on which other attributes (such as the presence or absence of an event), that contribute to the amount of communication delay such as the day of the week, time of day, or congestion, to which the current state of the apparatus itself belongs. A transmitted communication delay may be information on an actual measured communication delay in communication carried out by other terminal apparatuses having common attributes with the terminal apparatus to which the communication delay is provided, among the communications carried out in the past at the base station. For example, when the terminal apparatus is a smart phone, the information on the communication delay provided to the terminal apparatus may be information on the actual measured communication delay in communication carried out by another smart phone in the past. Further, if the terminal apparatus is a vehicle, the information on the communication delay provided to the terminal apparatus may be information on the actual measured communication delay in communication carried out by another vehicle in the past. Note that other terminal apparatuses herein may be terminal apparatuses that are logically different from the terminal apparatus to which the communication delay is provided. That is, communication carried out by the terminal apparatus itself in the past may also be handled as communication carried out by another terminal apparatus in the past.

Information to be notified can be, for example, information indicating which of multiple delay levels, such as: (1) sufficiently small so as to be able to carry out the remote operation with high accuracy; (2) sufficiently large such that the remote operation can be carried out but its accuracy is relatively low; (3) sufficiently large so as to not be able to carry out the remote operation; and (4) there is no effective information regarding the communication delay to which the actual measured communication delay belongs. In this case, the base station may transmit 2-bit information indicating whether the base station belongs to, for example, any of (1) to (4) described above, depending on the magnitude of the actual measured communication delay. According to this configuration, information on the actual measured communication delay can be transmitted to the terminal apparatus with sufficient precision for use in a given application with a small number of bits. Note that this is an example, with information capable of being indicated in a number of delay levels other than four. The notified information may also include a numerical value directly indicative of the actual measured communication delay. In this case, the actual measured communication delay value is quantized and transmitted by the number of bits in the field for storing the actual measured communication delay value in the notified information. According to this configuration, the terminal apparatus can predict in detail up to what extent of a communication delay communication can be carried out when the terminal apparatus is connected to the base station. Note that a 1-bit field indicating whether or not this information on the actual measured communication delay is included may be prepared. In this way, the amount of information on the signal transmitted in the absence of information on the communication delay can be reduced. As such, the information on the actual measured communication delay may be transmitted in any form.

The base station may also broadcast (for example, periodically) the information on the actual measured communication delay by a system information block (SIB) or the like, or may unicast by radio resource control (RRC) signaling or the like. Further, when the base station defines a specific frequency resource in which communication is carried out with a terminal apparatus of a specific category using information on the actual measured communication delay such as, for example, remote operation, the base station may transmit information on the actual measured communication delay in the frequency resource alone. Furthermore, the base station may transmit information on actual measured communication delays via a multicast targeting a terminal apparatus of a specific category using information on the actual measured communication delay such as remote operation. When the terminal apparatus is a predetermined type (category) of terminal apparatus, the base station transmits information on the actual measured communication delay, but may not transmit information to other types of terminal apparatuses. In the following, unless otherwise specified, information on the actual measured communication delay can be notified regardless of the format including broadcast/multicast/unicast. Further, the base station may only notify the terminal apparatus in a state in which the terminal apparatus is carrying out a predetermined operation in accordance with the operating state of the terminal apparatus of information on the actual measured communication delay. In one example, the predetermined operation may be moving at a speed exceeding a predetermined speed, carrying out remote operation or automatic operation when the terminal apparatus is a vehicle, or the like. This predetermined operation is merely an example and may include other operations. Note that, when the terminal apparatus is in the state of carrying out a predetermined operation, the terminal apparatus may transmit signals requesting information on communication delays to the base station.

The communication delay may also include a transmission delay for the time at which a signal propagates (for a cable or an air section) between two apparatuses forming a direct link, in addition to the processing time related to the demodulation of signals for communication of each apparatus involved in communication on the communication path, coding, or decoding of a code. For example, when the signal is transmitted from the terminal apparatus, the total time required for the signal to reach a partner apparatus, and when the signal is transmitted from the partner apparatus, the total time required for the signal to reach the terminal apparatus, may be referred to as a communication delay. Note that the communication delay may, for example, be a delay in the direct link between the terminal apparatus and the base station. That is, a communication delay, unless otherwise specified, refers to a delay in any of some or all of the communication paths, but is not limited to any of these.

By notifying the terminal apparatus of the information on the actual measured communication delay in this way, in one example, the terminal apparatus may not establish a connection with the base station having a large value of actual measured communication delay. In other words, the terminal apparatus narrows the base stations which are candidates for a handover destination to the base stations notifying the value of the actual measured communication delay to the extent that remote operation can be carried out, for example, based on information regularly broadcast from surrounding base stations. Then, a base station of sufficient wireless quality and easy to secure wireless resources, for example, is selected from the narrowed base stations, as the base station of the handover destination of the terminal apparatus.

For example, when the terminal apparatus receives the wireless quality of a measurement request from the base station, the terminal apparatus measures the wireless quality of a signal transmitted from a base station that is present around the base station, and reports the measured result to the base station. However, the wireless quality of the base station in which the value of the actual measured communication delay is large can be reported below the actual measured value. For example, the terminal apparatus may subtract a first predetermined value from the measured value of wireless quality for a first base station in which the value of the actual measured communication delay is large and it is difficult to carry out remote operation when connected, so that the reported value of wireless quality is lower than the actual measured value. In this way, since the base station in connection with the terminal apparatus determines that the wireless quality for the first base station is very low, the base station can prevent the terminal apparatus from being handed over to the first base station, or at least reduce the probability of being handed over to the first base station. Here, the abovementioned first predetermined value may be set to a very large value, while the base station corresponding to the reported value obtained by subtracting the first predetermined value can be set to a value such that the probability of a handover being carried out is approximately zero. For a base station that makes it difficult to carry out remote operation when connected, the terminal apparatus may report the same result as the case in which no radio waves to the connected base station are detected. Further, the terminal apparatus may subtract a second predetermined value from the measured value of wireless quality for a second base station in which the value of the actual measured communication delay is not small and it is expected to deteriorate the accuracy of remote operation when connected, so that the reported value of wireless quality is lower than the actual measured value. The second predetermined value is a value smaller than the abovementioned first predetermined value. In this way, the value of the wireless quality of the second base station to be reported is lowered below the value of the actual measured wireless quality, while the probability of the terminal apparatus being handed over to the second base station decreases due to the reported value. On the other hand, by making the second predetermined value relatively small, when there are no other base stations with a small actual measured communication delay and no low wireless quality around the terminal apparatus, the terminal apparatus can carry out the handover to the second base station. In this way, the terminal apparatus can connect to the second base station when there is no other appropriate base station as a handover destination. Then, for example, the terminal apparatus notifies the operator apparatus of the operator carrying out remote operation regarding the delay, so that the operator can continue remote operation after recognizing that the accuracy may be deteriorated. In addition, the terminal apparatus directly reports the measured value of wireless quality for a third base station in which the value of the actual measured communication delay is small and it is expected that remote operation can be carried out with high accuracy when connected. In this way, it is possible to increase the probability that the base station to which the terminal apparatus is connected selects the third base station as the base station of the handover destination for the terminal apparatus. Note that, even when the actual measured communication delay is low, for the third base station with extremely low communication quality, the base station to which the terminal apparatus is connected has the low wireless quality thereof reported according to the measured low wireless quality and thus has low probability of being selected as the base station of the handover destination. By reporting as described above, the terminal apparatus can select a base station, that is at least in a range capable of remote operation, has as little actual measured communication delay as possible, and has good wireless quality, as the base station of the handover destination.

In at least some embodiments, the terminal apparatus may autonomously carry out the handover. The terminal apparatus may, for example, pre-receive information for connection with adjacent base stations from the connected base station and, when handover is required, may autonomously determine the handover destination based on the values of the respective actual measured communication delays and the values of the wireless quality from among the adjacent base stations. In this case, the terminal apparatus removes base stations such as the abovementioned first base station that cannot be remotely operated from the candidate for the handover destination and selects a base station with the smallest possible actual measured communication delay and good wireless quality as the handover destination from among other adjacent base stations. The selection at this time can be carried out in any manner in which the actual measured communication delay and the wireless quality are considered, for example, when the value of the actual measured communication delay is relatively large, it is carried out using the value of the wireless quality using the second predetermined value described above. As described above, the terminal apparatus can carry out the handover to a base station that can be remotely operated in terms of the actual measured communication delay among surrounding base stations, thereby preventing remote operation from being unable to continue.

Remote operation is only one example of the application carried out in a vehicle provided with the terminal apparatus, with the information on the actual measured communication delay capable of being used for other applications. That is, while information on the actual measured communication delay is notified from the base station to the terminal apparatus, the application of the information is not limited to remote operation or automatic operation, with this information capable of being used in various applications.

In the following, some examples of configurations and operations of the base station and the terminal apparatus that carry out the abovementioned processing will be described.

Figure 2:
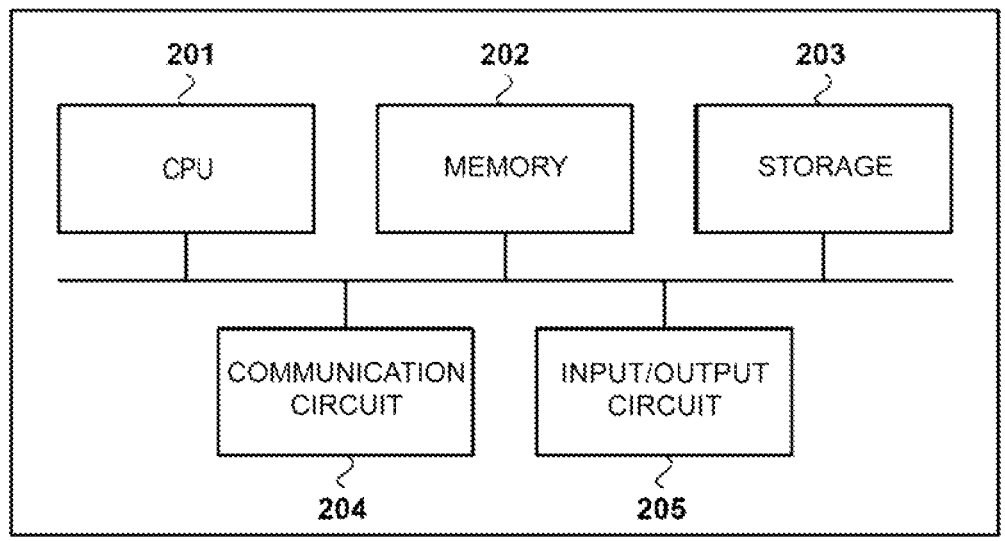
FIG. 2 is a block diagram of an exemplary embodiment of a base station and/or a terminal apparatus that may be included in the communication system shown in FIG. 1.

FIG. 2 illustrates an exemplary configuration of hardware that may be included in a base station and/or a terminal apparatus, for example, the base stations and terminal apparatus shown in FIG. 1. The base station and the terminal apparatus are, in one example, general purpose computers and include, for example, a processor (e.g., CPU 201), a memory 202, a storage 203, a communications circuit 204, and input/output circuit 205. The CPU 201, for example, implements a program stored in the memory 202 to carry out processing and control of the entire apparatus described below. Note that the CPU 201 may be replaced by any one or more processors, such as, but not limited to, an MPU or an ASIC. The memory 202 stores a program for causing the base station and the terminal apparatus to carry out various processing and also functions as a working memory when the program is implemented. The memory 202 is, in one example, a RAM (random access memory) and a ROM (read only memory). The storage 203 is, for example, a removable external storage, a built-in hard disk drive, or the like, and stores various types of information. The communication circuit 204 carries out signal processing on the communications, acquires various types of information from an external apparatus through the communication network, and transmits the various types of information to the external apparatus. Note that the information acquired by the communication circuit 204 may be stored, for example, in the memory 202 or the storage 203. Note that the base station and the terminal apparatus may include multiple communication circuits 204. For example, the base station may include a communication circuit for wired communication that can be used for communication with other base stations, along with a communication circuit for wireless communication with the terminal apparatus. The base station may, in one example, establish an X2 interface and communicate directly with other base stations or may communicate with other base stations via a core network using an SI interface. The base station may establish wireless links with other apparatuses to carry out communication in order to connect with other base stations and the core network. The wireless connection between the base station and the terminal apparatus is made in accordance with a cellular communication standard such as 5G or LTE. The base station and the terminal apparatus may have a communication circuit for communicating with each of the supported communication standards. The terminal apparatus may have a communication circuit for carrying out wireless communication according to standards related to, for example, a wireless LAN and other wireless communication schemes other than the cellular communication standards. The input/output circuit 205, for example, controls the output of screen information to be displayed on a display apparatus (not illustrated) or audio information output from a speaker, along with the reception of user input via a keyboard, a pointing device, or the like. Note that the input/output circuit 205 may control a device such as a touch panel that integrally carries out input and output. Note that, the configuration of FIG. 2 is an example, and the base station and the terminal apparatus may be configured by dedicated hardware to carry out the abovementioned processing, for example.

Figure 3:
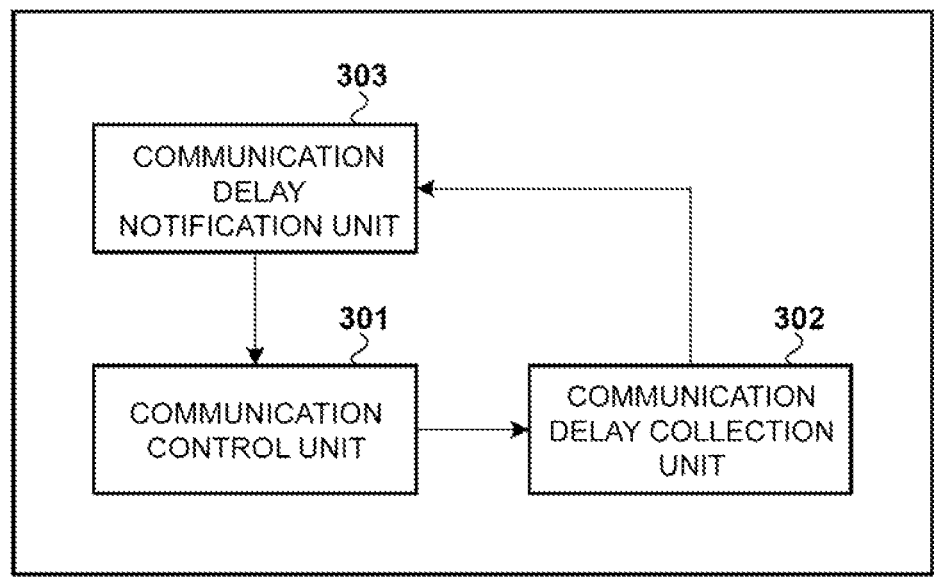
FIG. 3 is a block diagram of an exemplary embodiment of a base station that may be included in the communication system shown in FIG. 1.

FIG. 3 illustrates an exemplary functional configuration of a base station, for example, one of base stations 101, 102, 103, and 104 (shown in FIG. 1), according to the present embodiment. In at least some embodiments, the base station is a base station capable of wirelessly communicating with a terminal apparatus in accordance with the cellular communication standard. The base station is configured to include, for example, as a functional configuration thereof, a communication control unit 301, a communication delay collection unit 302, and a communication delay notification unit 303.

In the exemplary embodiment, the communication control unit 301 carries out execution control of communication by the base station. For example, the communication control unit 301 may control the communication circuit 204 (shown in FIG. 2) to establish a wireless link with the terminal apparatus and carry out wireless communication. The communication control unit 301 may also control the communication circuit 204 to establish an X2 interface or use an S1 interface to communicate with other base stations (e.g., in an adjacent relationship or in the event the distance between base stations is less than or equal to a predetermined distance) via the core network.

In the exemplary embodiment, the communication delay collection unit 302 collects the actual measured values of communication delays in the communication with respect to the terminal apparatus that has connected to an apparatus itself (e.g., the base station) and carried out communication. This collection may collect, for example, only the actual measured value of a communication delay of a wireless section between the terminal apparatus and the apparatus itself, or alternatively, may collect the actual measured value of the communication delay between the terminal apparatus and a partner apparatus. This collection is carried out, for example, on the basis of the round trip time (RTT) from the base station transmitting a predetermined signal that requires a reply to the terminal apparatus or the partner apparatus, to receiving a corresponding response signal. When the base station acquires the RTT, the base station can specify the communication delay from the apparatus itself to the terminal apparatus or the partner apparatus by subtracting the waiting time from when the terminal apparatus or the partner apparatus receives the predetermined signal to when it transmits the response signal from the RTT and dividing the result of the subtraction by 2. The base station may acquire information on communication delays by receiving a notification indicating to what extent a communication delay has occurred in actual communication from each terminal apparatus or each partner apparatus. The communication delay collection unit 302, for example, may group information on communication delays for each particular partner apparatus, such as an operator apparatus in remote operation, based on attributes such as the time of day in which communication is carried out, the day of the week, and whether or not it is a holiday. That is, the communication delay may be different between the time of day in which any section of a line of the base station or a communication path between the terminal apparatus and the partner apparatus is busy, and the time of day in which it is not busy. Thus, by classifying these and grouping the values of the collected communication delay for each attribute, the base station can notify the terminal apparatus of an appropriate value in accordance with the attributes of the communication environment at that time.

In the exemplary embodiment, the communication delay notification unit 303 carries out processing to notify the terminal apparatus of information (e.g., to transmit information to the terminal apparatus) associated with the actual measured values of the communication delays collected by the communication delay collection unit 302. For example, the communication delay notification unit 303 may specify the maximum value of the values collected by the communication delay collection unit 302 and notify the terminal apparatus (e.g., transmit the maximum value to the terminal apparatus). As referred to herein, notifying includes transmitting information. The communication delay notification unit 303 may notify the terminal apparatus of statistics such as the average value, median value, and standard deviation of the collected values. The communication delay notification unit 303, for example, may simultaneously and/or periodically transmit information associated with communication delays to the terminal apparatuses in a cell using broadcast signals such as SIB. Alternatively, or in combination with the simultaneous transmission of information, the communication delay notification unit 303 may periodically notify information on communication delays to the terminal apparatuses. In addition, the communication delay notification unit 303 may individually notify each terminal apparatus of information on communication delays by means of individual signaling such as RRC signaling, for example, when establishing a connection. Here, the time of establishing the connection may be the timing when the terminal apparatus is transitioned to an RRC_Connected state or when it has been handed over from other cells. Further, the communication delay notification unit 303, for example, may notify the terminal apparatus in an RRC_Inactive state of information on the communication delays using a small amount of data communication that can be carried out without transitioning to the RRC_Connected state. Further, the communication delay notification unit 303 may notify the terminal apparatus of information on communication delays (by broadcast/multicast/unicast) based on receiving instructions from other base stations or the core network (EPC). For example, when a terminal apparatus to be notified for information on communication delays is connected to other base stations in an adjacent relationship or within a predetermined distance, transmission instructions for information on communication delays may be issued from other base stations or the core network. The communication delay notification unit 303 may initiate the sending of information on, for example, periodic communication delays in response to receiving the transmission instructions. Further, information designating a terminal apparatus to which information on communication delays is provided may be acquired from other base stations or the core network and the information on communication delays may be individually provided to the designated terminal apparatus. The transmission instructions of information on communication delays from other base stations or the core network may be transmitted on the basis of the fact that a predetermined type of terminal apparatus or a terminal apparatus carrying out a predetermined operation is connected to another base station, along with the fact that a terminal apparatus connected to another base station has started the predetermined operation. In other words, the transmission instructions of information on communication delays may be issued, for example, as a trigger indicating that a terminal apparatus of a target for providing the communication delay is connected to an adjacent base station, or that a terminal apparatus connected to the adjacent base station has become a terminal apparatus to provide a communication delay. Note that the communication delay notification unit 303, when the apparatus itself forms multiple cells, may notify only information on communication delays regarding the cell itself in each cell, or may notify information on communication delays regarding two or more (in some cases, all) of the multiple cells in each cell.

Further, the base station, for example, may acquire information on communication delays (e.g., delays between the base station and the terminal apparatus, between the terminal apparatus and the partner apparatus, or the like) when the terminal apparatus connects to and communicates with the base station, from other base stations in an adjacent relationship or in which the distance between base stations is less than a predetermined distance. That is, the base station not only provides information on the communication delay for the communication path when the terminal apparatus is connected to the base station, but also information on the communication delay for the communication path when the terminal apparatus is connected to other base stations around the terminal apparatus. In this case, for example, information on communication delay when a terminal apparatus is connected to a base station and within a predetermined range of the base station may be notified to the terminal apparatus. In one example, the base stations included in an area such as a conventional tracking area (TA) or a RAN notification area (RNA) etc., may notify the terminal apparatus of information regarding each base station in the area in addition to information regarding the base station. In addition, an area separate from the area of TA, RNA, or the like may be provided. For example, information on communication delays may be notified to the terminal apparatus, in units of a notification area different from TA and RNA, which is defined as a terminal apparatus in a category that carries out communication for driving control of a vehicle such as remote operation and automatic operation. In this case, the terminal apparatus may receive, from a single base station, information on communication delays for multiple base stations included in a notification area including the positions of the base stations. The terminal apparatus can acquire information on communication delays of the base stations in an adjacent notification area, from a base station at an end of the notification area or in response to the terminal apparatus moving to the adjacent notification area. The terminal apparatus, for example, may acquire in advance identification information on a base station that is present at the end of the notification area from the base station in the area and, in response to detecting that the terminal apparatus has connected to the base station at the end, the terminal apparatus may request, from the base station at the end, information on communication delays of base stations of the adjacent notification area. Therefore, the base station may be requested to provide information on the communication delay of the base station in the adjacent notification area. Further, for example, when the terminal apparatus moves across the notification area, the terminal apparatus can acquire information on the communication delays of the base station included in the notification area after the movement from the base station, when processing the establishment of a connection with the base station to which the terminal apparatus is collected after the movement. In this way, by notifying the terminal apparatus of information on communication delays of the multiple base stations, the terminal apparatus can narrow down candidates for a handover destination before the deterioration of wireless quality in communication with the base station. In addition, as a result, the terminal apparatus can smoothly perform the handover to an appropriate base station.

Further, the base station may ascertain in advance routes on which the terminal apparatus moves, such as information on the planned travel route of the vehicle in which the terminal apparatus is equipped and notify information on the communication delays to the base stations around the route (for example, the base stations within a predetermined distance from the route to the cell end). For example, the base station acquires information on the planned travel route from the terminal apparatus or an operator apparatus. When the terminal apparatus is connected to a base station itself while moving along the route, the base station may notify the terminal apparatus of information on communication delays regarding a target candidate base station that may be handed over from the base station itself on the route, along with information on the communication delays of the base station itself. As a result, only information regarding the base stations around the route is transmitted to the terminal apparatus, such that, for the terminal apparatus, the base station can notify the terminal apparatus of information to be recognized with a small amount of information.

The communication delay notification unit 303 may notify the terminal apparatus of information on the communication delays, along with positional information indicating the position at which the apparatus itself (e.g., base station) is installed. This positional information may include, for example, latitude and longitude information as well as height information. Further, the communication delay notification unit 303 may notify the terminal apparatus of positional information of another base station, along with information on communication delay in the base station. By notifying the terminal apparatus of the position of the base station, an undesirable connection between the terminal apparatus and a distant base station can be prevented, even though the wireless quality is measured as high with short actual measured delay time, for example, due to a line-of-sight between the terminal apparatus and the distant base station. In other words, when the base station and the apparatus itself are far apart, the terminal apparatus may remove the base station as a candidate for a handover destination. In addition, when the terminal apparatus is capable of carrying out a handover autonomously, the terminal apparatus can foresee that the handover can occur in the early stages when connected with a distant base station and quickly initiate preparation for the handover process.

In addition to actual measured values of communication delays, the communication delay collection unit 302 may collect information regarding the position of the terminal apparatus when the actual measured value of the communication delay is obtained. For example, since the end of the cell formed by the base station and the periphery of the base station differ in terms of the condition in a propagation path (e.g., propagation distance, reflection, diffraction, and the like) of the radio waves, the actual measured values of the communication delays may also differ. Thus, by acquiring position and communication delays in association with each other, it is possible to notify the terminal apparatus of appropriate communication delay information according to the position. For example, this positional information may include latitude/longitude information, but may also, for example, include height information. For example, the communication delay collection unit 302 may collect, for a terminal apparatus located at the latitude and longitude corresponding to an intersection that intersects in three dimensions or the like, information regarding where the terminal apparatus is located among the multiple intersecting roads. The communication delay collection unit 302 may group information on the collected position into, for example, any of the latitude, longitude, and height ranges having a predetermined width. The communication delay collection unit 302 may then classify information on the communication delays for each position group. The communication delay collection unit 302 may acquire information collected by the base station from another base station which is adjacent or in which the distance between base stations is less than or equal to a predetermined distance.

In this case, the communication delay notification unit 303 may notify the terminal apparatus of information on the communication delay along with positional information. For example, the communication delay notification unit 303 may broadcast information in which a position and a communication delay are associated with each other, simultaneously providing the information to surrounding terminal apparatuses. In addition, the communication delay notification unit 303, for example, may acquire positional information on the terminal apparatus during connection or connection processing and provide information on the communication delays corresponding to the positional information to the terminal apparatus. The communication delay notification unit 303 may provide, to the terminal apparatus during connection or connection processing, information on the communication delays at all positions collected by the apparatus itself (base station) or positions corresponding to the scheduled route of the terminal apparatus. The communication delay notification unit 303 may notify a terminal apparatus of information collected by the adjacent base station. At this time, the communication delay notification unit 303 may notify the terminal apparatus of all acquired information or may notify the terminal apparatus of information regarding the base station for deploying a cell along the scheduled route of the terminal apparatus. At this time, the communication delay notification unit 303 may notify the terminal apparatus having a scheduled route that includes, for example, a three dimensional intersection, of information regarding the position of the three dimensional intersection (e.g., a height).

Note that the communication delay collection unit 302 may acquire positional information in addition to information on the communication delays only from a terminal apparatus located (passing or staying) in a predetermined area, such as an area in which different cells are formed in the height direction, such as the three dimensional intersection. In this way, the communication delay notification unit 303 may not provide information regarding cells having a height different from the scheduled communication path for the predetermined area, with respect to a terminal apparatus having, for example, the scheduled communication path passing through the predetermined area. As a result, the terminal apparatus can remove other base stations different from a base station that provides cells of other heights of the three dimensional intersection, for example, from a candidate for the handover destination. As a result, the terminal apparatus, for example, can prevent the occurrence of an event, such as a handover to a base station constituting a cell of a different height from the communication path before entering a tunnel, and the disconnection of a connection after a handover upon entering a tunnel.

Figure 4:
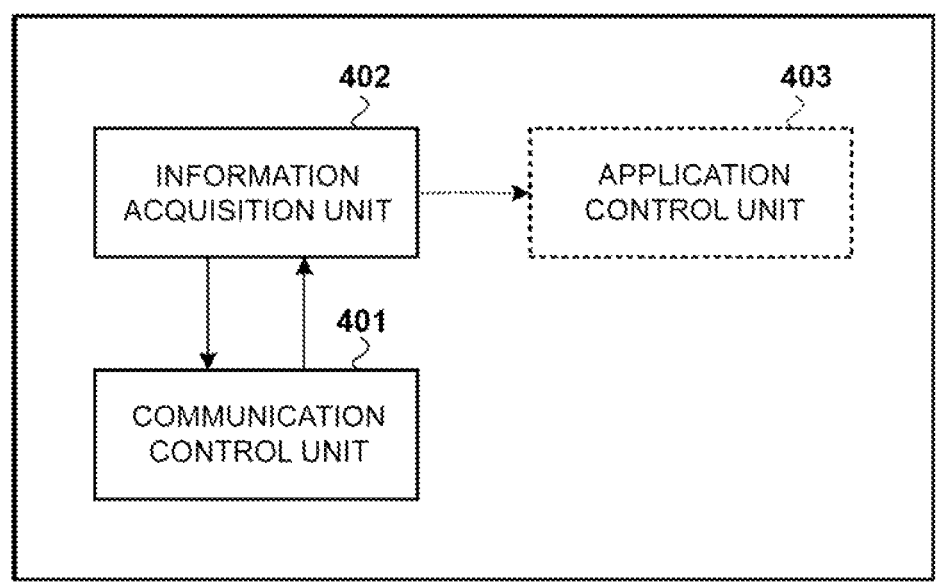
FIG. 4 is a block diagram of a terminal apparatus that may be included in the communication system shown in FIG. 1.

FIG. 4 illustrates an exemplary functional configuration of a terminal apparatus, for example, terminal apparatus 111 and/or terminal apparatus 112 (shown in FIG. 1), according to the present embodiment. In the exemplary embodiment, the terminal apparatus includes a communication control unit 401 and an information acquisition unit 402. Further, the terminal apparatus may include an application control unit 403. In the exemplary embodiment, the communication control unit 401 establishes a connection with a base station and controls communication. The information acquisition unit 402 acquires information associated with communication delays transmitted by the base station in at least the abovementioned manner. Note that the information acquisition unit 402, for example, may transmit a signal requesting information on communication delays to the base station when the terminal apparatus has transitioned to a state in which the terminal apparatus carries out a predetermined operation (for example, movement at or above a predetermined speed, automatic operation, remote operation, and preparation state thereof). The information acquisition unit 402 may also request information on communication delays of other base stations (e.g., in an adjacent relationship) connected to the base station. When such a request is made, the connected base station may transmit an indication to transmit information on the communication delay to other base stations or may collect information on communication delays from the other base stations and notify the terminal apparatus. The terminal apparatus acquires, in one example, information on the communication delays and controls communication with the base station on the basis of the information. For example, when an autonomous handover can be carried out, the terminal apparatus controls the communication control unit 401 so as to carry out a handover to a base station having a small communication delay and high wireless quality. When the terminal apparatus carries out the handover under the initiative of the base station, the terminal apparatus may report the wireless quality of the base station having a greater communication delay lower than the actual measured value. Note that the terminal apparatus, for example, stores in advance a predetermined value with respect to a communication delay capable of carrying out remote operation and may narrow down the candidates of a handover destination and adjust the value when reporting the wireless quality based on this predetermined value. Note that, for example, the terminal apparatus may selectively use information on the communication delay of an adjacent base station among the acquired information on the communication delays, for example, to narrow down the candidates of a handover destination. The terminal apparatus may, for example, selectively use information on the communication delays of a base station that deploys a cell along a scheduled movement path of the terminal apparatus, for example, to narrow down the candidates of the handover destination.

The terminal apparatus may use information on the communication delays for communication control. Alternatively, or in combination with communication control, the terminal apparatus may use information on the communication delays for control of an application operating in the terminal apparatus. For example, depending on the base station of the connection destination, the application control unit 403 can control the application quality, for example, such that the application quality is reduced when the communication delay is large or the application quality is increased when the communication delay is small.

Figure 5:
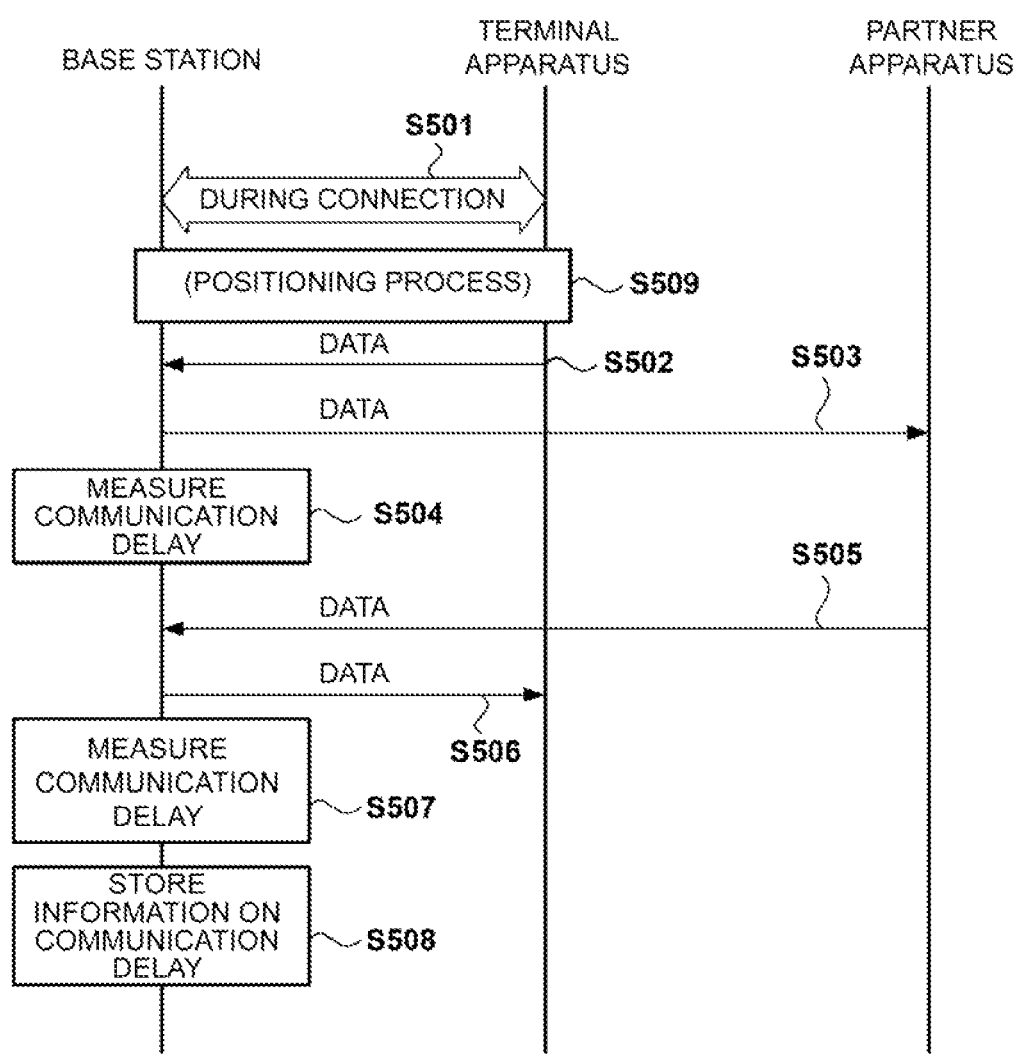
FIG. 5 is a diagram showing a first exemplary embodiment of a process performed by the communication system shown in FIG. 1.

Several examples of the process flow in the communication system described above will now be described. FIG. 5 is a diagram showing a first exemplary embodiment of a process performed by a communication system, for example, the communication system shown in FIG. 1. In the first exemplary embodiment, each base station collects the actual measured value of a communication delay. In the first exemplary embodiment, any terminal apparatus in the communication system may connect to any base station and communicate with a partner apparatus belonging to any of the networks via the base station. Note that communication between the base station and the partner apparatus is carried out in some form, however, for ease of explanation, an explanation of other apparatuses (for relaying communication) that are present in the communication path for connecting these apparatuses will be omitted.

In the first exemplary embodiment, the base station is in a state of establishing a connection with the terminal apparatus (S501). In other words, the terminal apparatus operates in an RRC_Connected state and is in a state of carrying out data communication with the base station. The base station measures (S504, S507) the communication delay between the base station and the terminal apparatus, along with the communication delay between the base station and the partner apparatus, when signals are transmitted from the terminal apparatus to a communicating partner apparatus (S502, S503) and when signals are transmitted from the partner apparatus to the terminal apparatus (S505, S506). The base station stores information on the communication delay obtained by the measurement (S508). Note that, when the partner apparatus is on an external network such as the Internet, the base station may acquire information on communication delays to a PDN (packet data network) gateway (P-GW) for connecting to the external network. Communication delays from P-GW to the partner apparatus are considered to be constant even when base stations to which the terminal apparatus connects are different. This is due to the fact that, by measuring communication delays with the P-GW, the base station can recognize the relative magnitude of the communication delays with the partner apparatus. Note that the base station may acquire information on the communication delays from the P-GW to the partner apparatus from other apparatuses such as the P-GW and the partner apparatus.

Further, the base station may acquire positional information associated with the terminal apparatus (S509). For example, the base station may transmit instructions to cause the terminal apparatus to carry out positioning using a positioning technique such as GPS (global positioning system), finger printing positioning, and the like, and report such. Note that the base station may acquire positional information associated with the terminal apparatus in the signals (S502) transmitted from the terminal apparatus. Furthermore, the base station may acquire positional information associated with the terminal apparatus via, for example, a confirmation response (not illustrated) transmitted from the terminal apparatus in response to transmitting data to the terminal apparatus (S506). This positional information may include information indicating the latitude and longitude, along with height information as described above. Note that height information associated with the terminal apparatus may be specified, for example, in accordance with the movement path of the terminal apparatus. For example, by specifying the path by which the terminal apparatus has entered a three dimensional intersection, the height of the terminal apparatus at the three dimensional intersection can be specified. Further, it may be recognized at which height of the three dimensional intersections the terminal apparatus is present, for example, based on the detection results (for example, a captured image) of the surrounding environment by a sensor such as imaging apparatuses installed in each height of the three dimensional intersection or an imaging apparatus provided in the terminal apparatus. Note that these are merely examples, with various techniques that can specify the position of the terminal apparatus capable of being used. When the base station acquires positional information associated with the terminal apparatus, the base station may group and store the actual measured value of the communication delay for each position (within a certain range).

The base station may group and store the actual measured value of the communication delay, for example, for each partner apparatus or for each attribute of the partner apparatus such as a domain of the partner apparatus and whether the partner apparatus belongs to an external network connected through the P-GW. Furthermore, the base station may group and store the actual measured value of the communication delay for each application of communication, based on attributes such as the time of day in which the communication is carried out, the day of the week, and whether or not it is a holiday.

Figure 6:
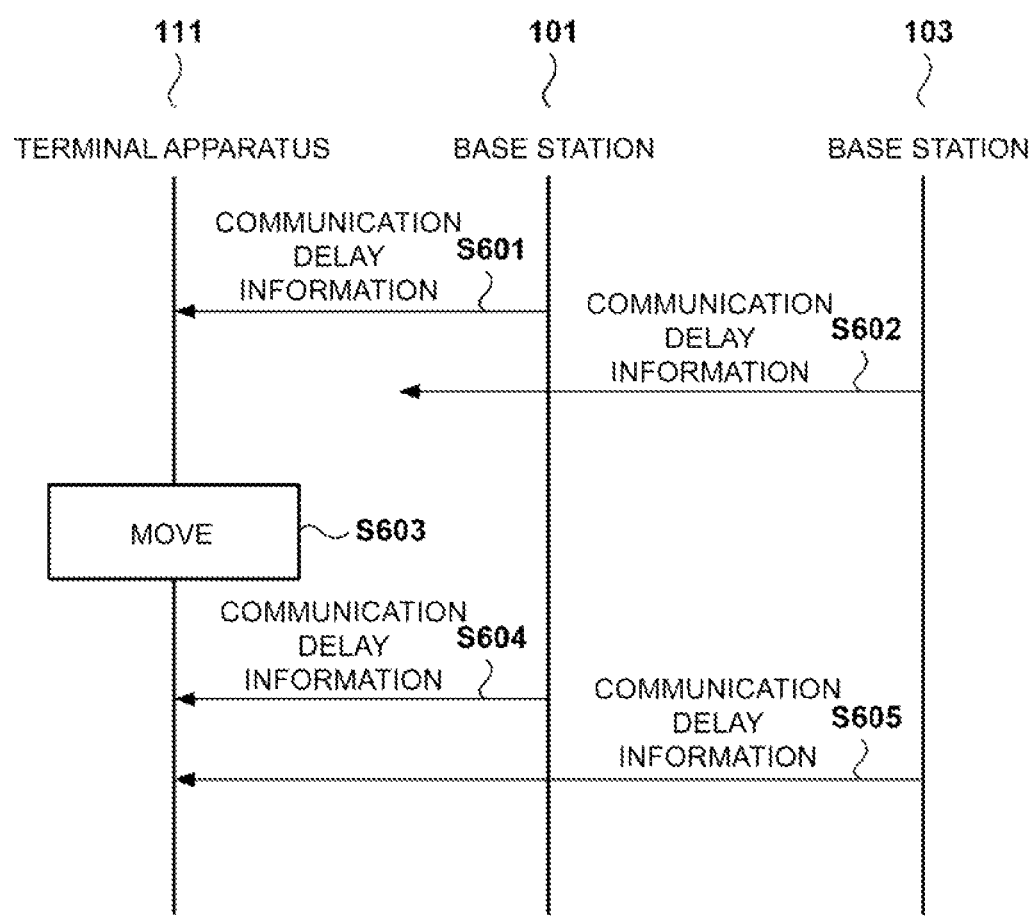
FIG. 6 is a diagram showing a second exemplary embodiment of a process performed by the communication system shown in FIG. 1.

FIG. 6 is a diagram showing a second exemplary embodiment of a process performed by a communication system, for example, the communication system shown in FIG. 1. In the second exemplary embodiment, each base station transmits information corresponding to communication delays in the base station itself to a terminal apparatus. FIG. 6 illustrates an example in which the terminal apparatus 111 in FIG. 1 moves from the cell 121 formed by the base station 101 toward the cell 123 formed by the base station 103. In the present example, the terminal apparatus 111 may be in a state of connection with the base station 101 (RRC_Connected state) or may be in a waiting state such as RRC_Idle or RRC_Inactive. Further, in the present example, for ease of explanation, it is assumed that the base station 102 and the base station 104 are not considered.

Each base station may transmit broadcast signals periodically, for example, and transmit information (e.g., information on communication delays) indicating to what extent communication delay terminal apparatuses connected to each base station can communicate with each base station (S601, S602, S604, and S605). The terminal apparatus 111 initially stays in the cell 121 formed by the base station 101 and exists outside the range of the cell 123 formed by the base station 103. Thus, the terminal apparatus 111 receives a signal (S601) from the base station 101, but does not receive a signal (S602) from the base station 103. Thereafter, when the terminal apparatus 111 moves within the range of the cell 121 (S603) and enters within the range of the cell 123, the terminal apparatus 111 receives not only a signal (S604) from the base station 101 but also a signal (S605) from the base station 103. In this way, in order for each base station to provide information by means of broadcast signals, the terminal apparatus can acquire information from base stations that are not connected. As a result, the terminal apparatus 111 can become aware of communication delays before a handover, for the case in which it is assumed that the terminal apparatus 111 connects to and communicates with base stations 103 that can be candidate base stations for the handover when leaving the cell 121.

If the communication delay notified by the base station 103 is longer than a requested delay (e.g., a predefined maximum and/or threshold delay for remote operation), the terminal apparatus 111 may remove the base station 103 as a candidate for the handover destination. If the communication delay notified by the base station 103 is shorter than the requested delay, the terminal apparatus 111 may be handed over to the base station 103 in response to the wireless quality of a signal from the base station 103 being greater than or equal to a predetermined value. For example, the wireless quality may be a value represented by various indicators such as the SNR (signal to noise power ratio), SINR (signal to interference and noise power ratio), RSRP (reference signal received power), RSRQ (reference signal received quality), and RSSI (received signal strength indicator).

Figure 7:
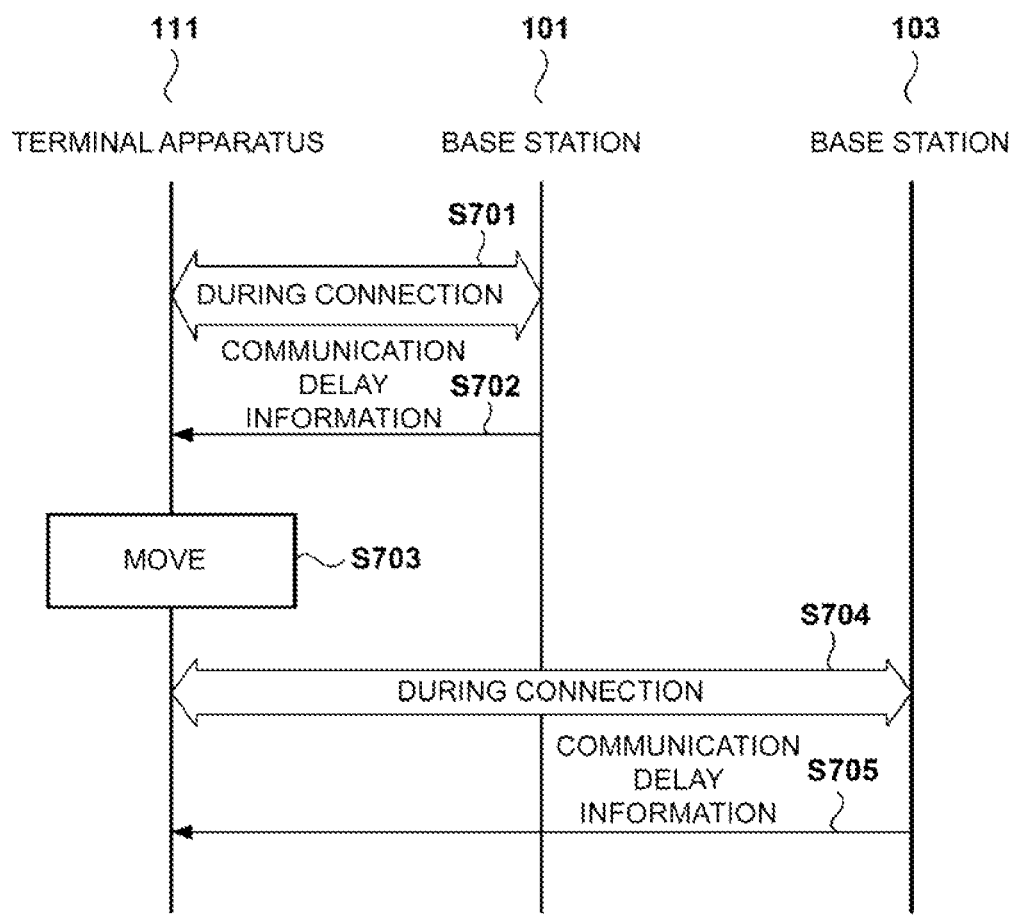
FIG. 7 is a diagram showing a third exemplary embodiment of a process performed by the communication system shown in FIG. 1.

FIG. 7 is a diagram showing a third exemplary embodiment of a process performed by a communication system, for example, the communication system shown in FIG. 1. In the third exemplary embodiment, each base station transmits information on communication delays in the base station itself to a terminal apparatus. FIG. 7 also illustrates an example in which the terminal apparatus 111 moves from the cell 121 toward the cell 123 (see FIG. 1.). In the present example, it is assumed that the terminal apparatus 111 is in a state (RRC_Connected state) of being connected to the base station 101 (S701). Moreover, in the present example, for ease of explanation, the base station 102 and the base station 104 are not considered. In the example illustrated in FIG. 7, each base station provides information to a terminal apparatus in a connected state.

The base station 101 notifies the terminal apparatus 111 in the connected state of information on communication delays (S702). The base station 103 does not provide information to the terminal apparatus 111, which is not in the connected state, at this point. Thereafter, the terminal apparatus 111 moves (S703) to be handed over to the base station 103 (S704). In this case, the base station 103 notifies the terminal apparatus 111, which has been connected, of information on the communication delays (S705). In this way, by providing information to the terminal apparatus to which the base station is connected, a large amount of highly accurate information can be provided to the terminal apparatus. The provision of this information may be carried out, for example, using a physical downlink shared channel (PDSCH). In the third exemplary embodiment, information is provided to the terminal apparatus while connected (e.g., connected state), but this is not a limitation, and for example, information may be provided during processing for transitioning to the connected state. For example, the information may be provided by an RRC message to establish an RRC connection.

Figure 8:
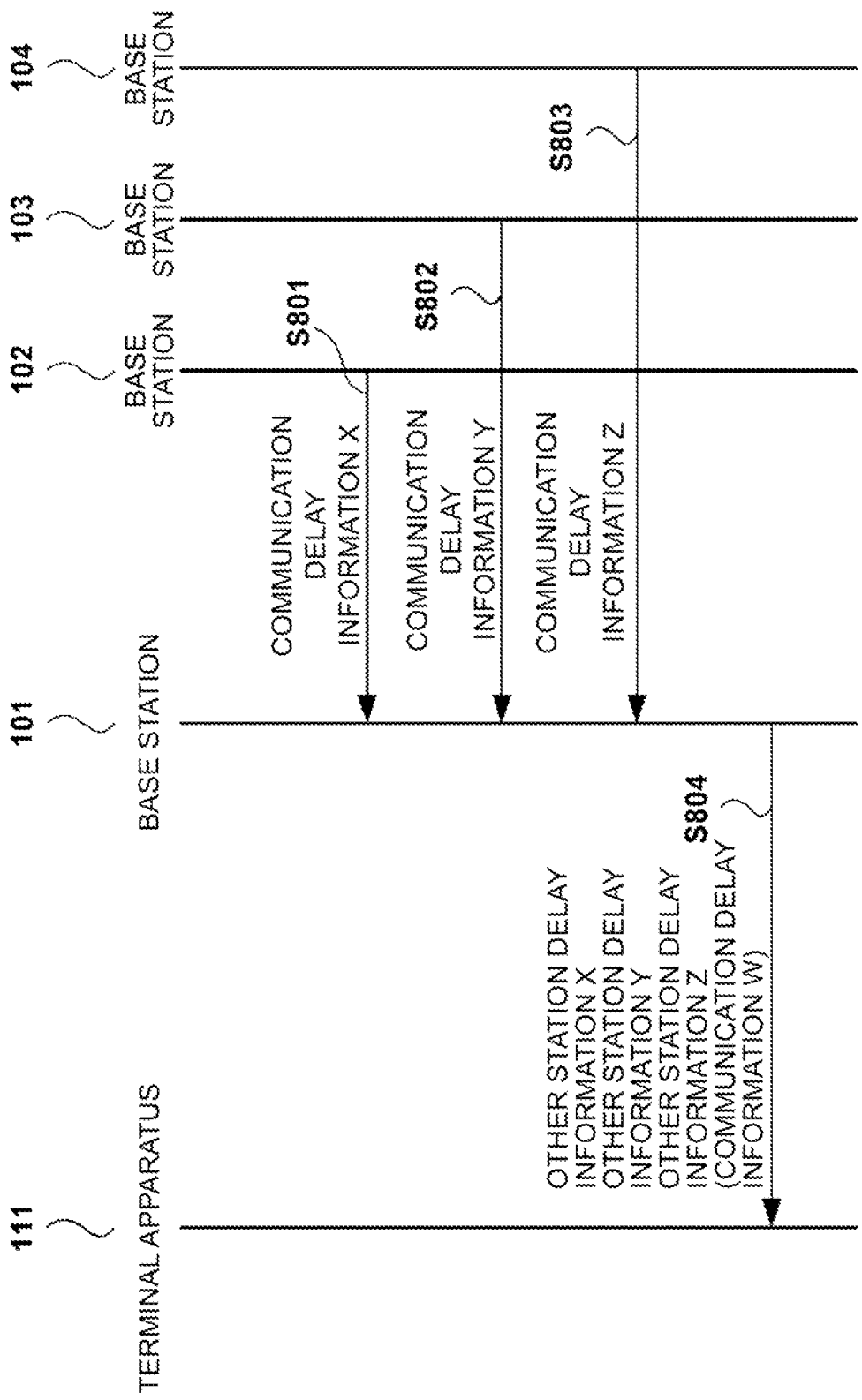
FIG. 8 is a diagram showing a fourth exemplary embodiment of a process performed by the communication system shown in FIG. 1.

FIG. 8 is a diagram showing a fourth exemplary embodiment of a process performed by a communication system, for example, the communication system shown in FIG. 1. In the fourth exemplary embodiment, each base station transmits information on communication delays to a terminal apparatus. Note that, in the present example, the terminal apparatus 111 may be in a state of connection with the base station 101 or may be in a waiting state. In the present example, each base station acquires/receives information associated with other base stations in the periphery (in which the distance between other base stations and the base station itself is within a predetermined distance or in an adjacency relationship with the base station itself) and provides the terminal apparatus with other base station delay information, which is information associated with communication delays including the acquired information. The base station may store an adjacent cell list, with other base stations forming adjacent cells capable of being specified. In FIG. 8, for example, the base station 101 receives information associated with the communication delays from the base station 102, the base station 103, and the base station 104 in a state in which the base stations are recognized as base stations forming neighbor cells (S801, S802, and S803). For example, the information on the communication delay from the base station 102 indicates value X, information on the communication delay from the base station 103 indicates value Y, and information on the communication delay from the base station 104 indicates value Z. The base station 101 notifies the terminal apparatus 111 of other station delay information X to Z, which is information associated with the communication delays acquired from the other base stations, as well as information on the communication delay of the base station 101 itself (S804). For example, information associated with the communication delay of the base station 101 itself indicates a value W. The base station 101 may notify the other station delay information for all other base stations and the delay information on the base station itself to the terminal apparatus simultaneously, or may transmit only information regarding some other base stations at one time and transmit information regarding the remaining base stations at another time. The base station may broadcast information including information on multiple base stations or may transmit the information to each terminal apparatus individually. Here, for example, when information on the communication delays is provided for the selection of a handover candidate, the base station 101 may notify the terminal apparatus which is connected of only information acquired from other surrounding base stations, but may not provide information on the communication delays of the base station itself. Note that the base station 102 to base station 104 may also acquire information on the communication delays of the surrounding base station such as the base station 101, and notify surrounding terminal apparatuses of the information. As a result, the terminal apparatus can acquire information on communication delays of other base stations different from the base station from the base station to which the terminal apparatus is connected after the handover.

Moreover, in the example described above, the base station acquires information on other base stations in the periphery (in which the distance between other base stations and the base station itself is within a predetermined distance or in an adjacency relationship with the base station itself), however, the embodiment is not limited thereto. For example, information on other base stations at a position considerably distant from the base station may also be acquired, such as other base stations within a tracking area. In FIG. 8, while an example is illustrated in which the base station directly acquires information from other base stations, the embodiment is not limited thereto. For example, each base station may provide information associated with communication delays to network nodes, such as a mobility management entity (MME) and acquire information on the other base stations from the network nodes.

Multiple base stations may also be partitioned with a TA, RNA, or other predetermined areas described above and information on the communication delays may be shared among base stations within the area so as to provide information on communication delays that is common within the area. Further, for example, when 5G communication is carried out under a control of a macro cell by LTE or the like, information on communication delays for the 5G base station may be notified by communication in LTE. In this case, the terminal apparatus can acquire information on the communication delays for all base stations within the wide range. As a result, for example, the terminal apparatus can move while continuing to be handed over to an appropriate base station within the wide range.

Further, the base station may, for example, acquire a scheduled movement path from the terminal apparatus or a partner apparatus for the terminal apparatus in the connection and provide information on the communication delay only for base stations that form a cell along the path. In this way, information provided to the terminal apparatus is reduced by not providing information regarding base stations forming the cell that deviates from the path, thus preventing the waste of wireless resources. Further, the base station may specify a type of terminal apparatus based on the category of the connected terminal apparatus, the application to be carried out, and the like, and may provide information on communication delays for only a predetermined type of terminal apparatus. For example, information on communication delays may be provided only for a terminal apparatus that carries out communication for carrying out driving control of a vehicle based on communication such as remote operation and automatic operation. Further, the base station may provide information on communication delays only when requested from the terminal apparatus. In accordance therewith, it is possible to prevent information on the communication delays from being provided unnecessarily, and as a result, the wireless resources can be effectively utilized.

Figure 9:
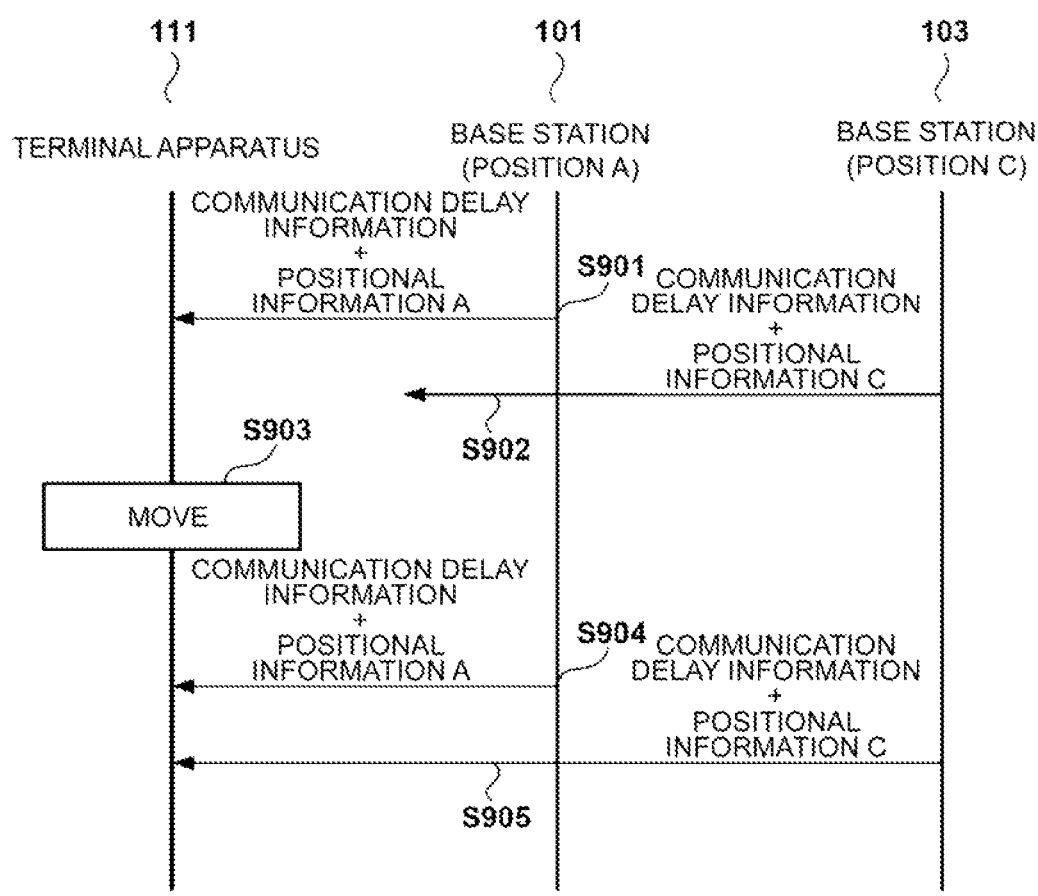
FIG. 9 is a diagram showing a first alternative embodiment of the process of FIG. 6.
Figure 10:
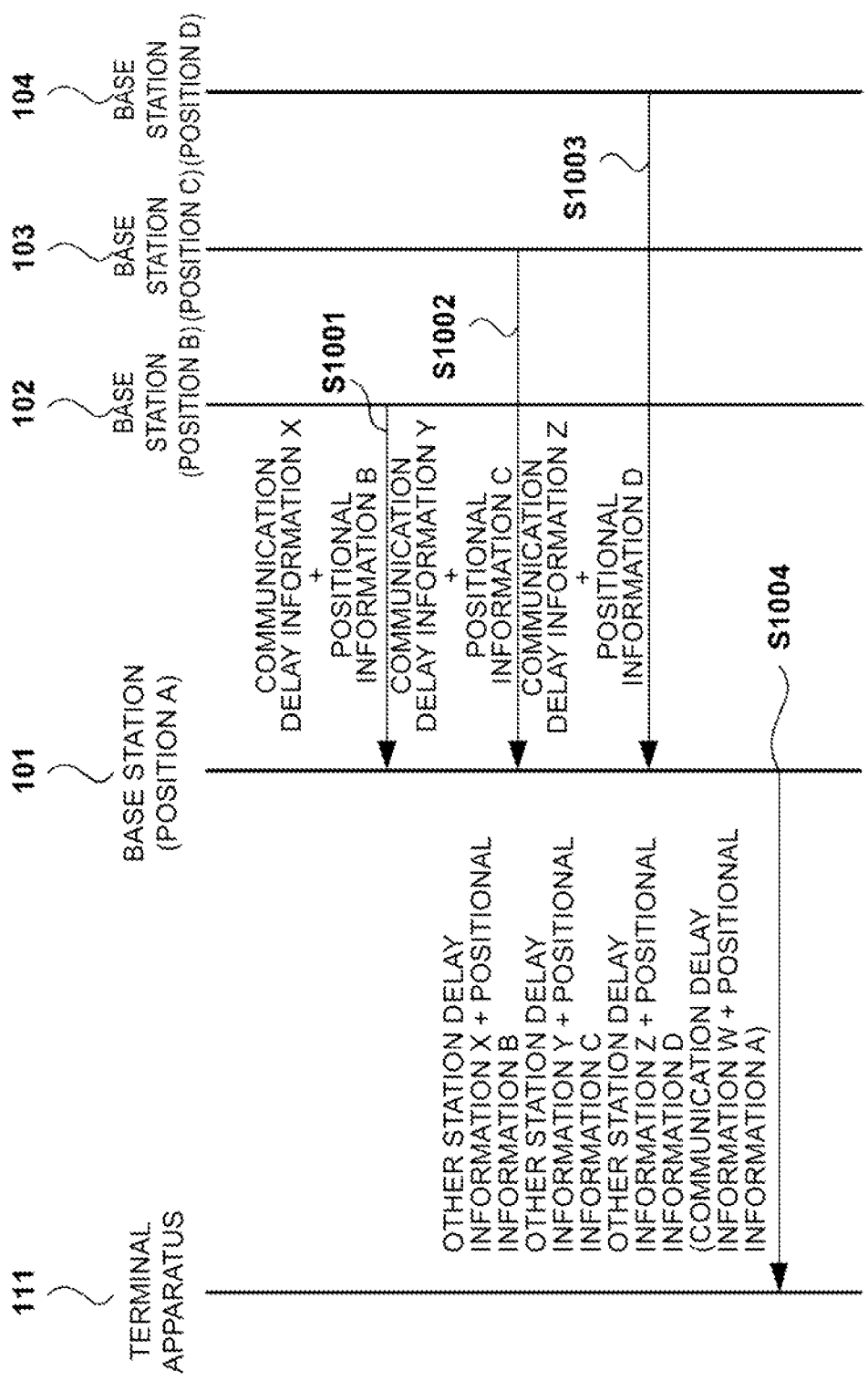
FIG. 10 is a diagram showing an alternative embodiment of the process of FIG. 7.

Note that, in addition to the information on communication delays, the base station may notify information on the position of the base station. FIGS. 9 and 10 are diagrams showing exemplary embodiments of processes performed by a communication system, for example, the communication system shown in FIG. 1. More specifically, FIG. 9 illustrates an exemplary embodiment in which each base station directly notifies a terminal apparatus of information on communication delays for the base station itself and positional information on the base station itself. FIG. 10 illustrates an exemplary embodiment in which the base station notifies a terminal apparatus of other station delay information related to other base stations other than the base station itself along with other station positional information on the other base stations. In the exemplary embodiment shown in FIG. 10, the base station may not notify the terminal apparatus of information on communication delays or positional information associated with the base station itself; however, the base station may notify the terminal apparatus of this information related to the base station itself. In the process illustrated in FIG. 9, each base station (base station 101 and base station 103) stores information indicating the position of the base station itself. Then, in the process of FIG. 9, the base station notifies the terminal apparatus of the positional information on the base station itself along with the information on the communication delays (S901, S902, S904, and S905). Note that the process of FIG. 9 is the same as the process illustrated in FIG. 6, except that the positional information is also notified. The positional information on the base station may be notified separately from the information on the communication delays. In other words, the positional information on the base station may be notified via one signal along with the information on the communication delays or may be notified via two or more signals. In addition, as illustrated in FIG. 7, the notification of the positional information may be carried out separately from the base station to the terminal apparatus connected to the base station. In this case, the same processes as those in FIG. 7 are carried out, except that the positional information associated with the base station is also notified to the terminal apparatus connected to the base station, along with the information on the communication delays or separately from the information on the communication delays. In the process illustrated in FIG. 10, the base station 101 acquires other station delay information from the base station 102 to the base station 104 and positional information on these base stations (S1001 to S1003). Then, the base station 101 notifies the terminal apparatus 111 of other station delay information and positional information related to these other base stations (S1004). At this time, the base station 101 may notify the terminal apparatus 111 of information on the communication delays in the base station itself along with positional information on the base station itself. Note that the positional information and the other station delay information may be notified by a single signal or may be notified separately. Note that the process of FIG. 10 is the same as the process illustrated in FIG. 8, except that the positional information is also notified. Further, each base station may notify a network node of information on the communication delays along with the position of the base station itself and may acquire other station delay information as well as positional information for other base stations from the network node. Note that it is assumed that the position of the base station is fixed. For this reason, regarding positional information on other base stations in the periphery, for example, the base station may acquire and store information once when installing other base stations, after which, the base station may acquire only other station delay information in the same manner as S801 to S803 in FIG. 8. In this case, the base station associates the acquired other station delay information with positional information on the corresponding base station and notifies the terminal apparatus of the associated information.

The position of the base station may also include height information. In this way, the terminal apparatus can carry out control so as not to prevent handover to an inappropriate base station, such as a base station that has a short communication delay but is distant or a base station forming cells of different heights in a three dimensional intersection.

Figure 11:
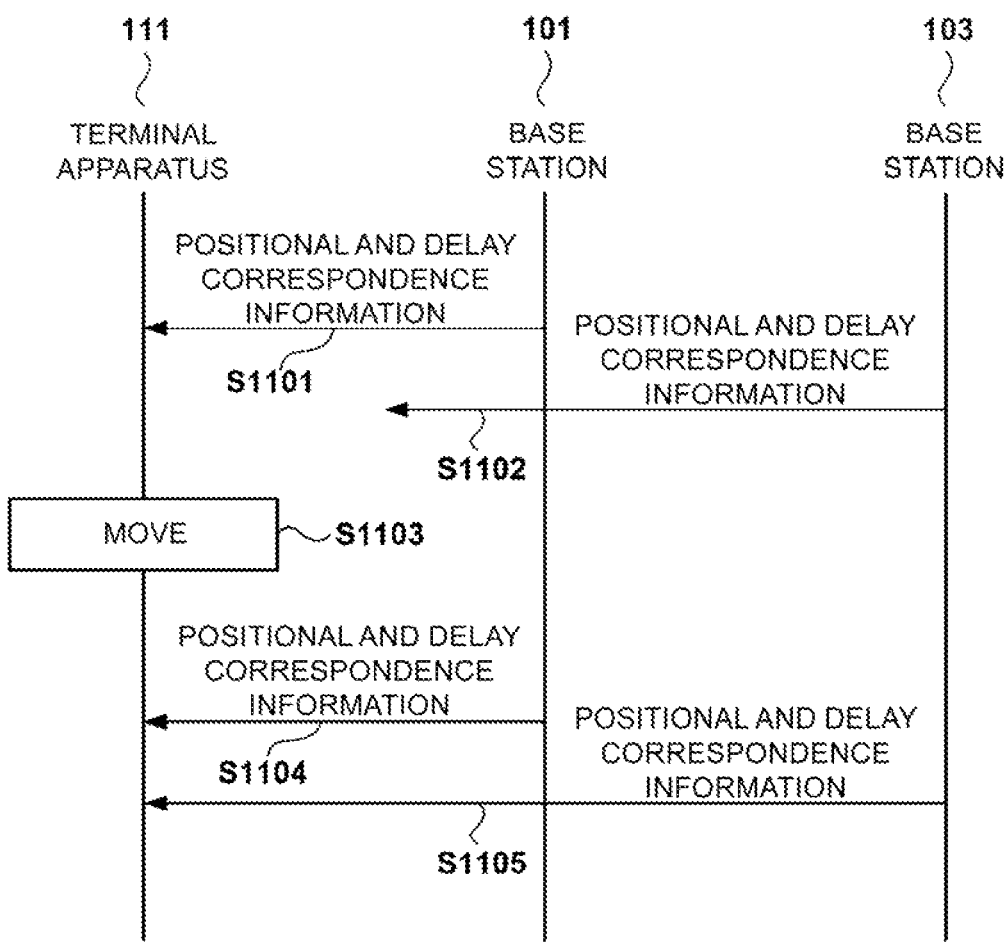
FIG. 11 is a diagram showing a second alternative embodiment of the process of FIG. 6.
Figure 12:
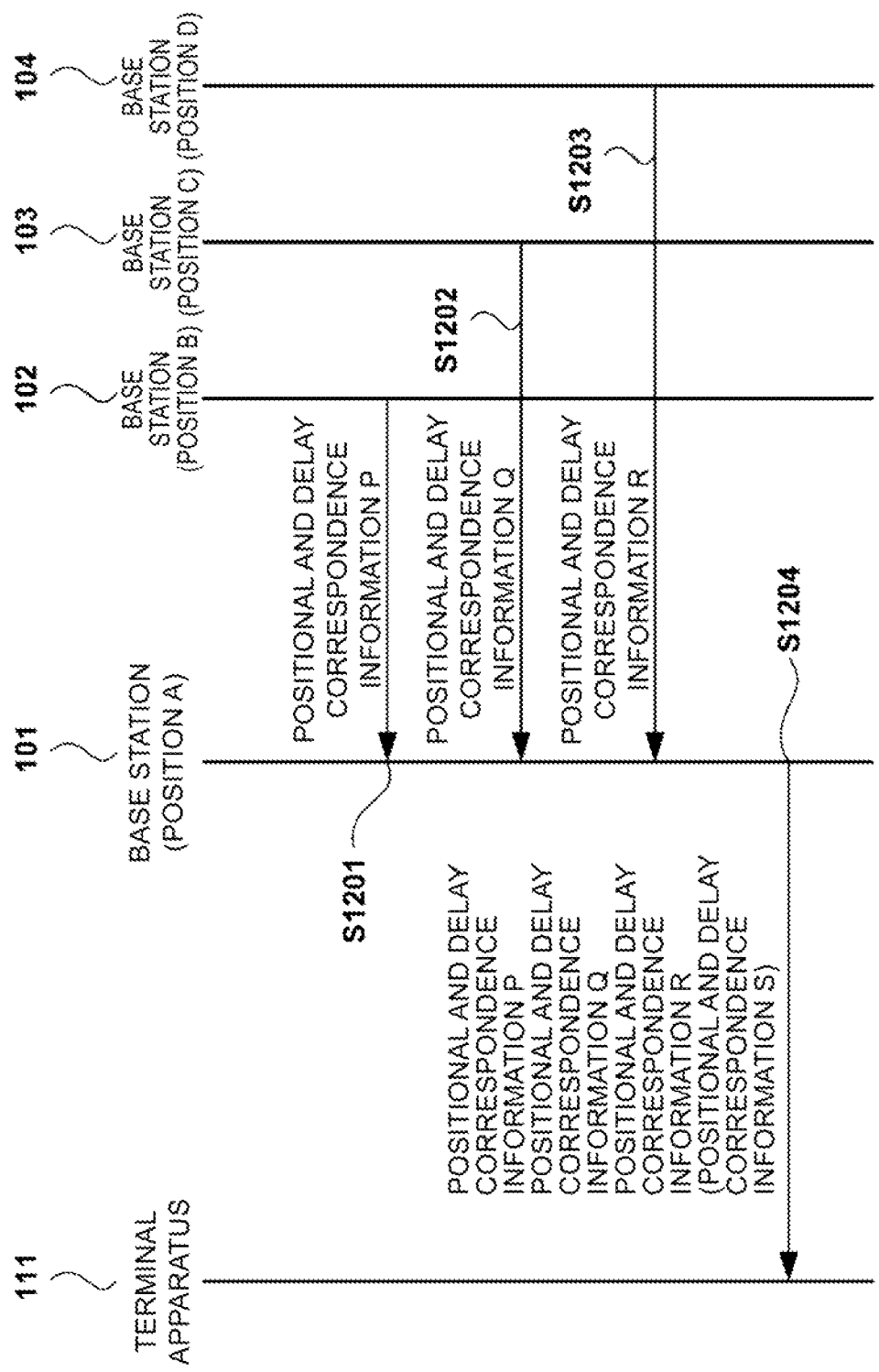
FIG. 12 is a diagram showing an alternative embodiment of the process of FIG. 8.

Further, the base station may notify the terminal apparatus of information that associates the position of the terminal apparatus with the size of the communication delay. This process flow is described with reference to FIGS. 11 and 12. FIG. 11 illustrates an example of a case in which each base station directly notifies a terminal apparatus of positional and delay correspondence information indicating a corresponding relationship between a position within the range of a cell formed by the base station itself and information on communication delays. Further, FIG. 12 illustrates an example of a case in which a base station notifies a terminal apparatus of positional and delay correspondence information indicating a corresponding relationship between the position within the range of cells formed by other base stations other than the base station itself and information on communication delays. Further, it is assumed that, for this process, the position of the terminal apparatus when communication is carried out in the past and information on the communication delays at the position are stored in association with each other in the base station, for example, by processes such as S509 in FIG. 5. In the process illustrated in FIG. 11, the base station notifies, to the terminal apparatus, positional and delay correspondence information including the position of the terminal apparatus and information on communication delays associated with the position (S1101, S1102, S1104, and S1105). Note that the process in FIG. 11 is the same as the process in FIG. 6, except that the position of the terminal apparatus and the information on the communication delays are associated with each other and notified. Here, while the base station notifies the terminal apparatus of positional and delay correspondence information relating to positions within the range of cells formed by the base station itself and communication delays corresponding to the positions, it is not necessary to collectively notify the information at all positions. In other words, the base station may notify the terminal apparatus of positional and delay correspondence information regarding part of multiple positions within the range of cells formed by the base station itself, then notify the terminal apparatus of the positional and delay correspondence information regarding another portion on another occasion. In addition, as illustrated in FIG. 7, the information may be notified separately from the base station to the terminal apparatus in connection with the base station. In the processing illustrated in FIG. 12, the base station 101 acquires positional and delay correspondence information for the positions included in the cells formed by each of the base stations 102 to 104 (S1201 to S1203). Then, the base station 101 notifies the terminal apparatus 111 of positional and delay correspondence information regarding the positions within the range of cells by these other base stations (S1204). At this time, the base station 101 may notify the terminal apparatus 111 of positional and delay correspondence information in the base station itself. Note that the base station 101 may collectively notify the terminal apparatus 111 of positional and delay correspondence information related to multiple base stations and may notify the terminal apparatus 111 of only part of these, then notify another part on another communication occasion. Note that the process of FIG. 12 is the same as the process illustrated in FIG. 8, except that the positional information is also notified.

The positional information may also include the position in the height direction. According to this configuration, the terminal apparatus can specify in advance a base station in which communication delays are sufficiently small at current or future positions of the terminal apparatus itself. According to this configuration, the terminal apparatus, for example, can specify in advance the base station to which the handover destination is appropriate depending on a scheduled movement path. Note that the base station may acquire positional information and the scheduled movement path of a terminal apparatus from the terminal apparatus (or a partner apparatus) and notify the terminal apparatus of delay information regarding the position in response thereto.

Figure 13:
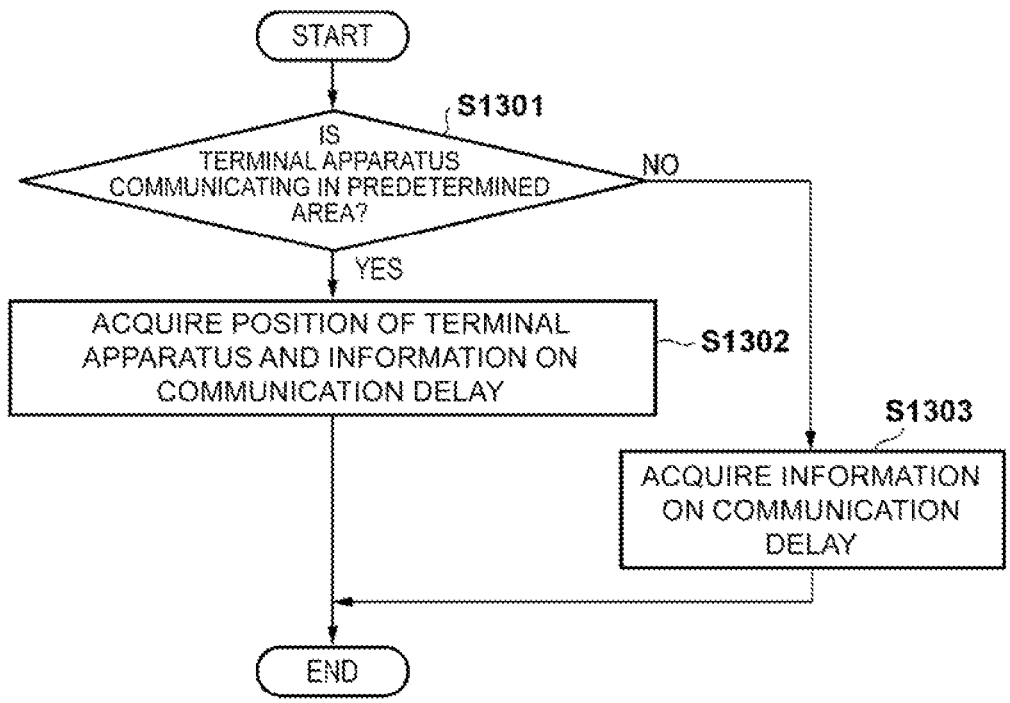
FIG. 13 is a flowchart of an exemplary process performed by a base station.

In at least some embodiments, the base station may provide positional and delay correspondence information only in a predetermined area, such as a three dimensional intersection. In other words, for the predetermined area, the base station may provide the terminal apparatus with positional and delay correspondence information indicating a corresponding relationship between the position of the terminal apparatus and the communication delays at the position, while for other positions, the base station may not provide information on the communication delays or may provide information on the communication delays not associated with the position. Note that, when the terminal apparatus is communicating within the predetermined area, the base station acquires information on the position of the terminal apparatus and communication quality, whereas when the base station is communicating outside the predetermined area, the base station acquires information on the communication delays without acquiring information on the position. An example of this process is illustrated in FIG. 13. In this process, the base station collects positional information associated with a terminal apparatus and information associated with communication delays for the terminal apparatus communicating in a predetermined area among the cells formed by the base station itself (YES in S1301 and S1302). On the other hand, for the terminal apparatus communicating outside the predetermined area, the base station collects only information associated with the communication delay (NO in S1301 and S1303). Here, collecting only information on the communication delay refers to obtaining information on the communication delay without associating with at least the position of the terminal apparatus. In other words, even for the case in which the base station has acquired the position of the terminal apparatus outside the predetermined area, the base station does not store information on the position in association with information on the communication delays.

Figure 14:
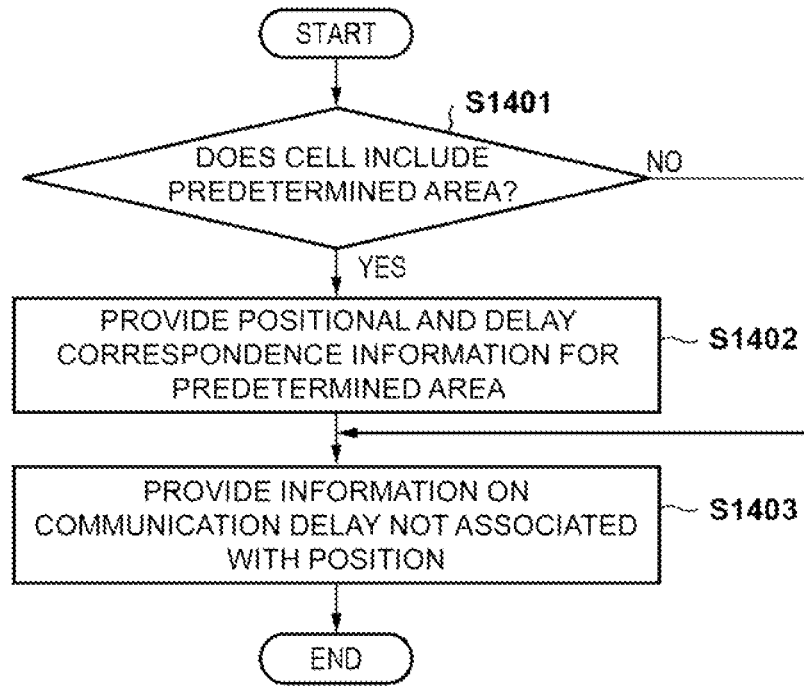
FIG. 14 is a flowchart of an exemplary process performed by a base station.

Further, the base station may provide different information depending on whether the predetermined area is included within the cells formed by the base station itself in providing information to the terminal apparatus. An example of this process flow is illustrated in FIG. 14. In the event a base station includes a predetermined area within the range of cells formed by the base station itself (YES in S1401), the base station provides positional and delay correspondence information indicating positional information and information on communication delays at the position for the predetermined area (S1402). Moreover, at this time, the base station may provide information on the communication delays without specifying the position for positions outside the predetermined area (S1403). Note that, when the base station does not include the predetermined area within the range of cells formed by the base station itself (NO in S1401), the base station does not provide the positional and delay correspondence information as described above, but provides information on the communication delays without specifying the position outside the predetermined area (that is, the entire cell) (S1403). Note that the base station may collect information that associates the position of the terminal apparatus and communication delays at all positions within the range of cells formed by the base station itself. Even in this case, the base station may provide positional and delay correspondence information for positions within the predetermined area by the process in FIG. 14, while the base station may provide information on communication delays for positions outside the predetermined area. This makes it possible to significantly reduce information regarding the outside of the predetermined area, for example, making it possible to provide detailed information on the communication delays for each position for the predetermined area where information on communication delay for each position (height) is important, such as a three dimensional intersection. Note that the base station may provide information to the terminal apparatus presented in the range of the cells formed by the base station itself, in addition to providing, for example, the information to a network node such as an MME or other base stations, or providing the information from the other base stations to the terminal apparatus as illustrated in FIG. 8.

Further, when the terminal apparatus is a predetermined type of terminal apparatus, the base station notifies information on communication delays, but may not notify other types of terminal apparatuses of the information. For example, while the base station may provide information on communication delays to a vehicle control terminal apparatus for an automatic operation vehicle, a remote operation vehicle, or the like, the base station may not provide information on communication delays for a smart phone or the like. The type of the terminal apparatus may be categorized according to a category of the terminal apparatus.

Figure 15:
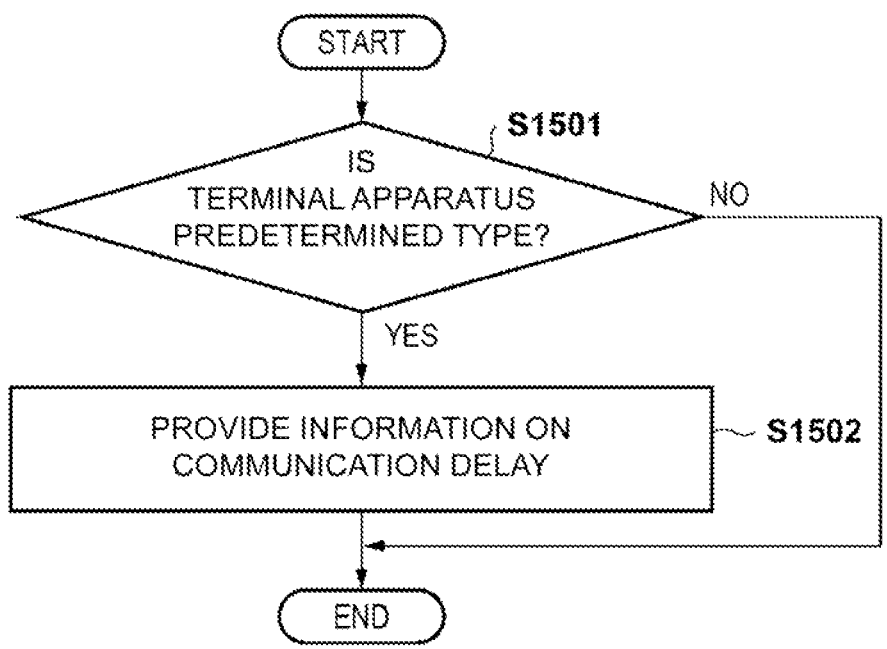
FIG. 15 is a flowchart of an exemplary process performed by a base station.

Furthermore, the predetermined type can be set by the network operator. An example of this process flow is illustrated in FIG. 15. The base station may determine whether the type of terminal apparatus is a predetermined type (S1501) and, for the predetermined type of terminal apparatus, may provide information on communication delays (and, if necessary, information on the position corresponding to the communication delays or information on position of the base station) (YES in S1501 and S1502). On the other hand, the base station may operate so as not to provide information on communication delays for terminal apparatuses other than the predetermined type (NO in S1501).

Figure 16:
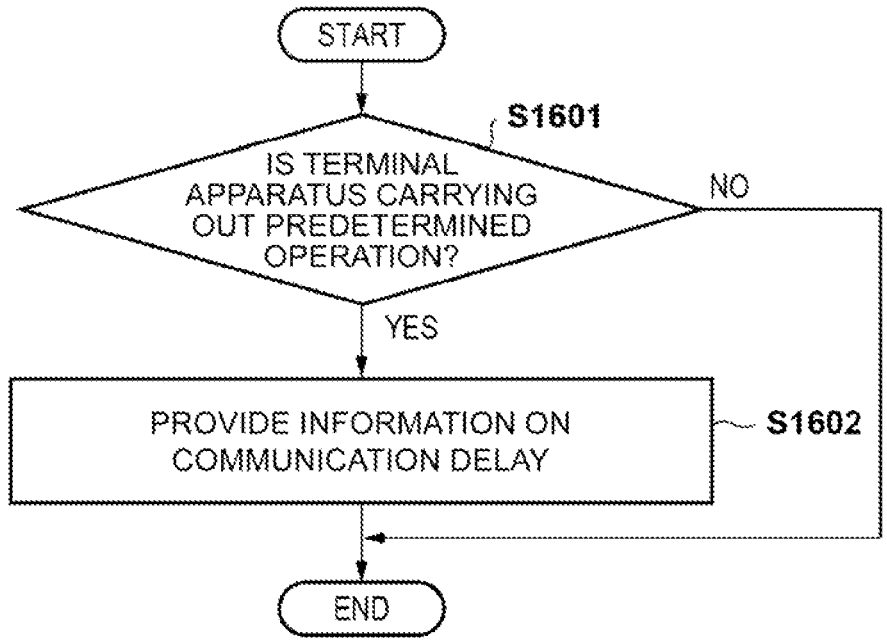
FIG. 16 is a flowchart of an exemplary process performed by a base station.

Further, when the terminal apparatus is carrying out a predetermined operation, the base station notifies the information on the communication delays but may not notify a terminal apparatus not carrying out the predetermined operation of the information. For example, while the base station provides information for a terminal apparatus that is carrying out a predetermined operation such as one in which the moving speed of the terminal apparatus is equal to or higher than a predetermined speed, or one in which a predetermined application such as automatic operation or remote operation is being carried out or is being prepared for carrying out, the base station may not provide information for a terminal apparatus that is not carrying out such predetermined operations. Whether or not the predetermined operation is being carried out may, for example, correspond to the operating mode of the terminal apparatus. Further, the predetermined operation can be set by the network operator. An example of this process flow is illustrated in FIG. 16. The base station may determine whether the terminal apparatus is carrying out a predetermined operation (S1601) and may provide information on communication delays (and, if necessary, information on the position corresponding to the communication delays or information on the position of the base station) for the terminal apparatus that is carrying out the predetermined operation (YES in S1601 and S1602). On the other hand, the base station may operate so as not to provide information on communication delays for a terminal apparatus not carrying out the predetermined operation (NO in S1601).

Figure 17:
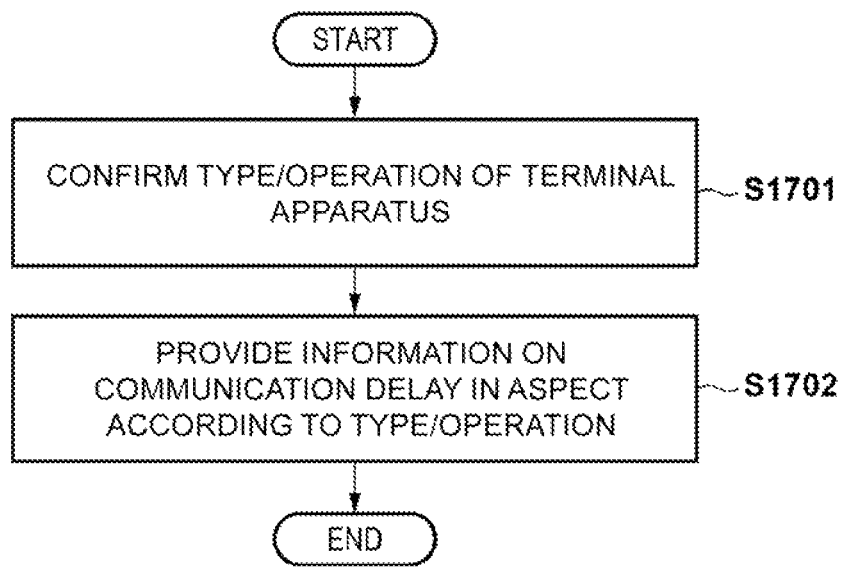
FIG. 17 is a flowchart of an exemplary process performed by a base station.

Further, the base station may provide information on the communication delays to the terminal apparatus according to a predetermined aspect in accordance with the type and operation of the terminal apparatus. This process flow is illustrated in FIG. 17. First, the base station confirms the type/operation of the terminal apparatus (S1701), then notifies the terminal apparatus of information on communication delays in the aspect according to the type/operation (S1702). For example, when the type of terminal apparatus is a vehicle control terminal apparatus for an automatic operation vehicle or a remote operation vehicle, the base station may provide information on the maximum value of the communication delays, while when the terminal apparatus is an on-board vehicle terminal apparatus or a smart phone that is not used for vehicle control, the base station may provide information on the average value of the communication delays. Further, while the base station may provide information on the maximum value of the communication delays for the terminal apparatus that is carrying out a predetermined operation such as that in which the moving speed of the terminal apparatus is equal to or higher than a predetermined speed, or that in which a predetermined application such as automatic operation or remote operation is being carried out or is being prepared for carrying out, the base station may not provide information on the average value of the communication delays for a terminal apparatus that is not carrying out such operation. Note that the type/operation and aspects of providing information on the terminal apparatus are merely examples, with other types/operations capable of being considered or information on other aspects capable of being provided.

Figure 18:
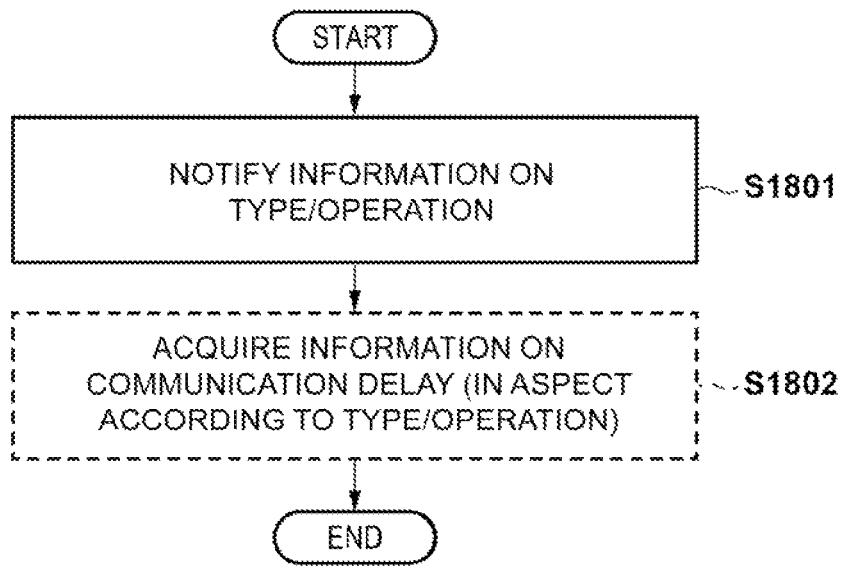
FIG. 18 is a flowchart of an exemplary process performed by a terminal apparatus.

Note that the information on the type and operation of the terminal apparatus, for example, may be provided from a network node that manages information on the terminal apparatus to the base station or the terminal apparatus may notify the base station of the information. The process flow when a terminal apparatus notifies the information on the type and operation of the terminal apparatus itself is illustrated in FIG. 18. The terminal apparatus notifies a base station of information indicating the type and operation of the terminal apparatus itself (S1801). Then, the terminal apparatus acquires information on communication delays from the base station, for example, when the type of terminal apparatus itself is a predetermined type or when a predetermined operation is being carried out (S1802). Note that, as described above, the base station may not provide information on the communication delays when the type of terminal apparatus is not the predetermined type or when the predetermined operation has not been carried out. Therefore, in this case, the terminal apparatus terminates the process without carrying out the process of S1802. Further, the terminal apparatus may acquire information on communication delays in the aspect in accordance with the type and operation of the terminal apparatus itself. Note that notification of the type and operation by the terminal apparatus may be carried out when the terminal apparatus is connected to the base station. For example, the terminal apparatus is configured to perform processing for connecting with the base station at the time of startup or during movement beyond a tracking area or RNA, thereby providing information for the base station at this time. The terminal apparatus, for example, may establish a connection with the base station to provide information to the base station in response to a control application such as automatic operation or remote operation being activated. Note that, when acquiring this information, the base station may retain the information in the base station itself or may transfer the information to a network node such as an MME to store the information in the network node. By the network node storing such information, it becomes easy to take over the information on the terminal apparatus to another base station when the terminal apparatus moves to the area of another base station after disconnecting from the base station.

Figure 19:
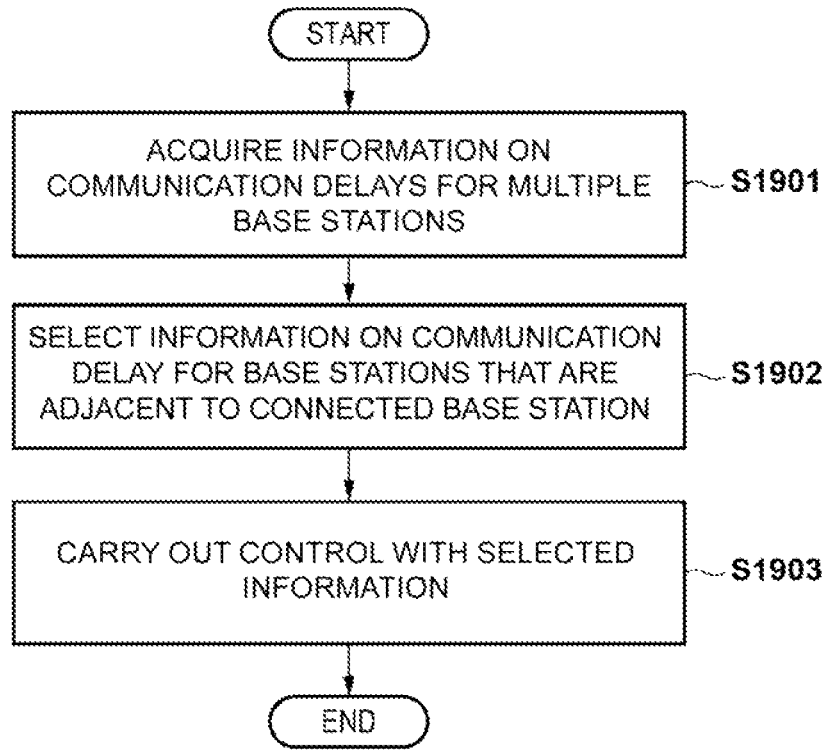
FIG. 19 is a flowchart of an exemplary process performed by a terminal apparatus.
Figure 20:
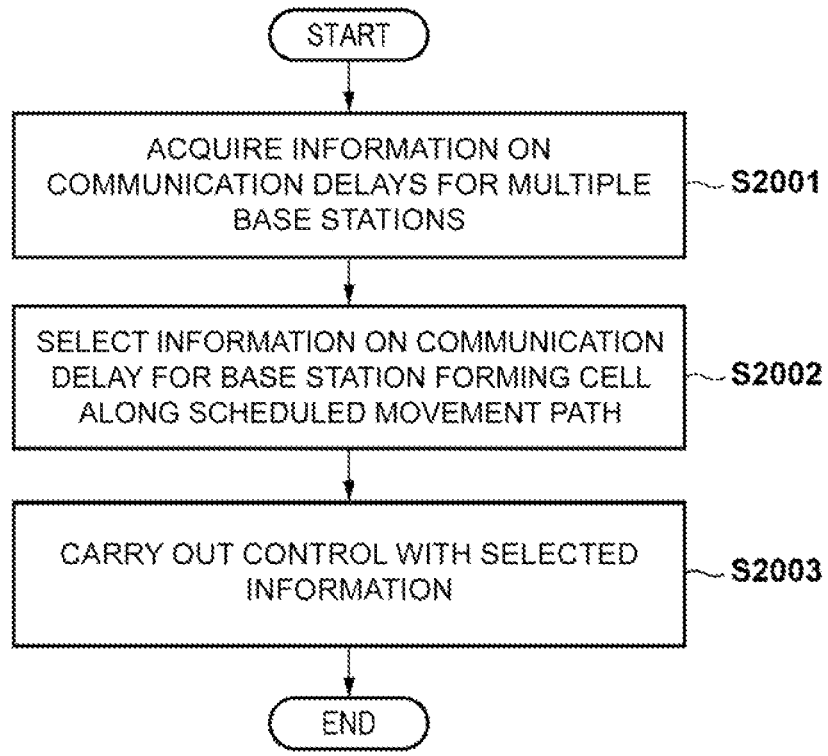
FIG. 20 is a flowchart of an exemplary process performed by a terminal apparatus.

The terminal apparatus can carry out control of the terminal apparatus itself based on the acquired information. At this time, the terminal apparatus may acquire information on multiple communication delays for multiple base stations and select information used for controlling the terminal apparatus itself from among the information. For example, the terminal apparatus can carry out control such as a handover to a base station having a short communication delay. At this time, since the handover destination may be another base station that is adjacent to the currently connected base station, the terminal apparatus may select, from among information on communication delays for multiple base stations, information on communication delays for another base station that is adjacent to the currently connected base station for handover control. In the event the scheduled route of the terminal apparatus itself is known, the terminal apparatus should only perform a handover to a base station that forms a cell along the scheduled route. Thus, the terminal apparatus may select, from among information on communication delays for the multiple base stations, information on communication delays for the base station forming the cell along the scheduled route for handover control. Further, the terminal apparatus can set the level of operation carried out by terminal apparatus itself based on the selected information on communication delays. For example, when control for remote operation or automatic operation is being carried out, the terminal apparatus can carry out high precision and multi-function control in the event a communication delay in the surrounding base station is sufficiently short, while the terminal apparatus can carry out control such as lowering control accuracy and limiting functions in the event the communication delay is not short. Examples of these process flows are illustrated in FIGS. 19 and 20. The terminal apparatus acquires information on communication delays for multiple base stations (S1901, S2001) and selects, among the acquired information, information on the communication delays used for control in the terminal apparatus itself. For example, the terminal apparatus selects information on communication delays for other base stations that are adjacent to the currently connected base station as the communication delay used for control within the terminal apparatus itself (S1902). In addition to, or alternatively, the terminal apparatus may select information on a communication delay for a base station forming a cell along a scheduled route of the terminal apparatus itself as a communication delay used for control in the terminal apparatus itself (S2002). Note that these are examples, with information used for control in the terminal apparatus capable of being selected based on other criteria. Thus, the terminal apparatus carries out control in the terminal apparatus itself on the basis of the selected information (S1903, S2003). In this way, by the terminal apparatus selecting information to be used from among the acquired information, it is possible to prevent the terminal apparatus from not carrying out appropriate control by referring to information that should not be considered in and of itself.

Figure 21:
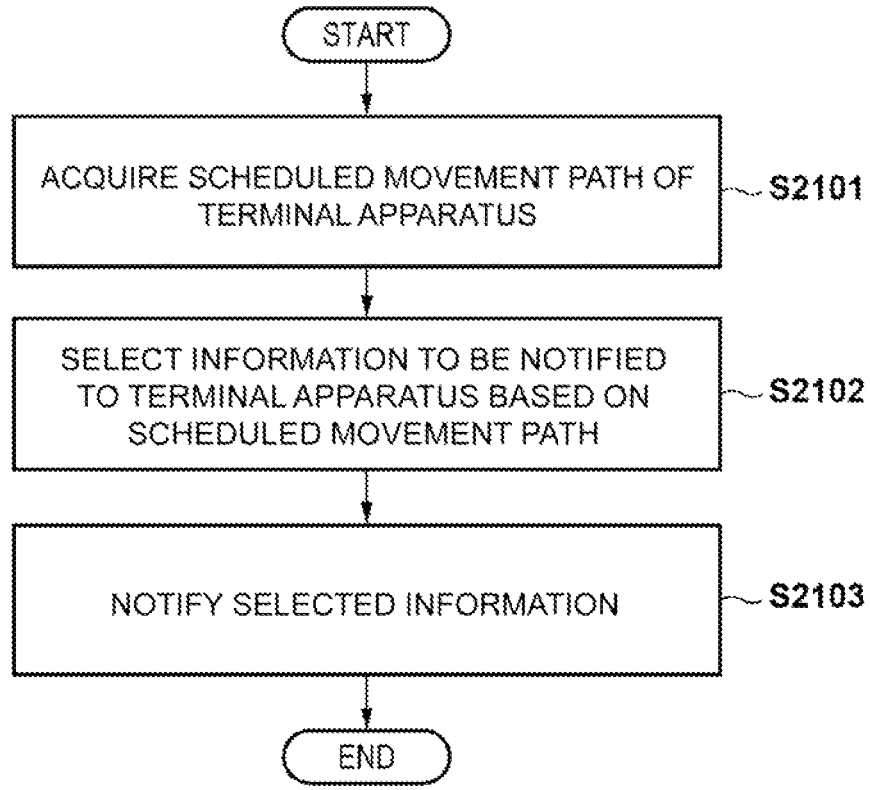
FIG. 21 is a flowchart of an exemplary process performed by a base station.
Figure 22:
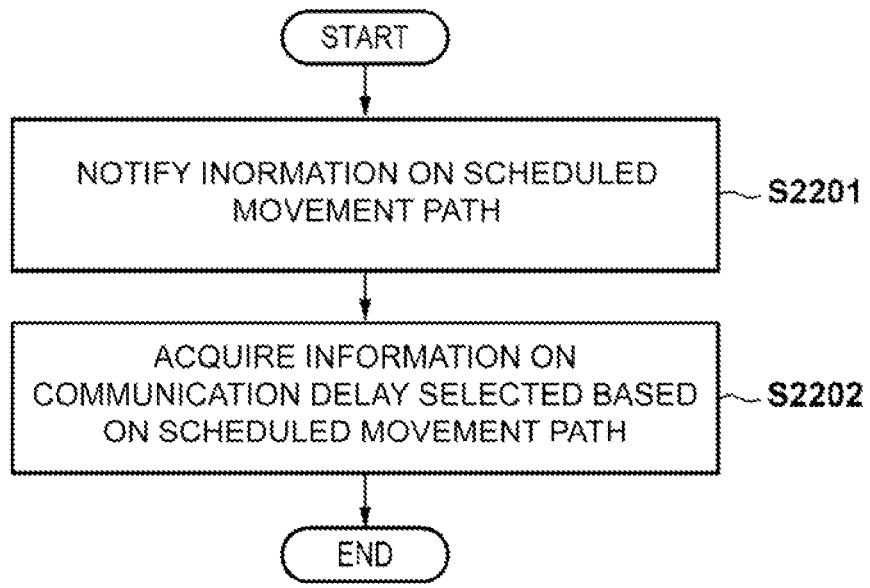
FIG. 22 is a flowchart of an exemplary process performed by a terminal apparatus.

Note that in FIG. 20, the process when the terminal apparatus selects information to be used for control of the terminal apparatus itself according to the scheduled movement path is illustrated, wherein the base station may select information to be provided on the basis of the scheduled movement path of the terminal apparatus when the base station provides other station delay information. An example of the process flow in this case is illustrated in FIGS. 21 and 22. Note that FIG. 21 illustrates an example of the process flow of a base station, while FIG. 22 illustrates an example of the process flow of a terminal apparatus. With this process, first, a scheduled movement path of the terminal apparatus is notified from the terminal apparatus to the base station (S2101, S2201). The scheduled movement path can be, for example, a path set by an automatic operation function or a remote operation function of a vehicle, or by a navigation application or the like in the terminal apparatus. Then, based on the notified scheduled movement path, the base station selects other station delay information to be notified to the terminal apparatus among other station delay information acquired in the manner of S801 to S803 in FIG. 8 (S2102). For example, the base station may select other station delay information for other base stations that form cells in a scheduled movement path or other base stations that form cells within a predetermined range from the scheduled movement path. Then, the terminal apparatus is notified of the other station delay information selected by the base station (S2103, S2202). This eliminates the need for the terminal apparatus to carry out processing for selecting information used in the control of the terminal apparatus itself.

Figure 23:
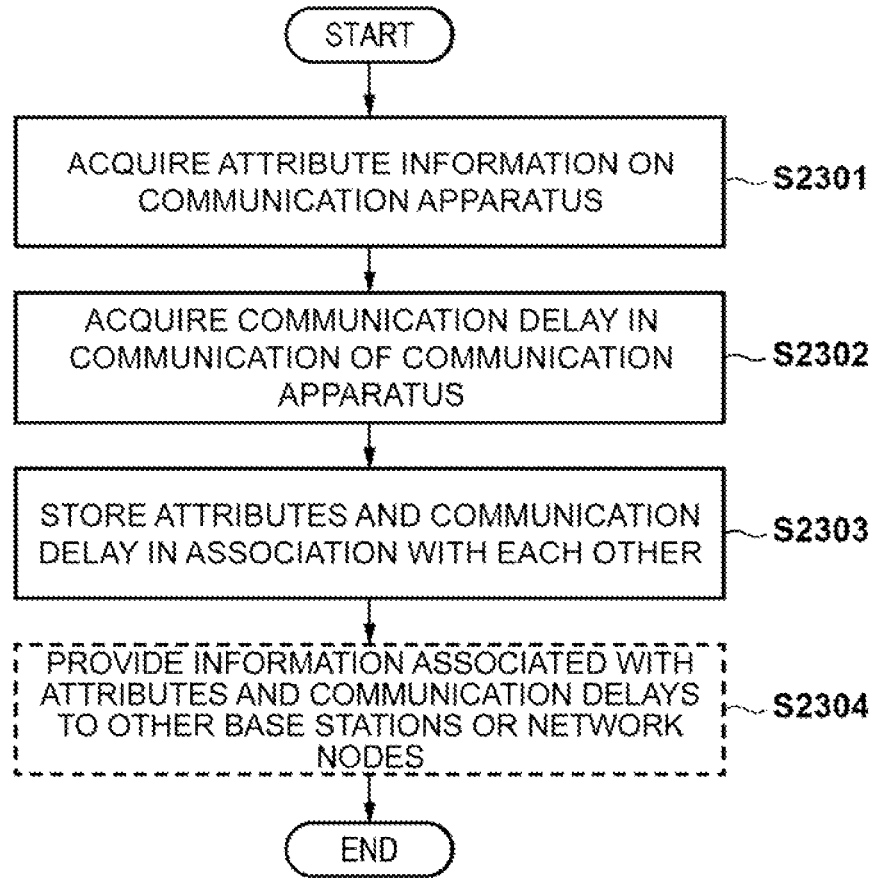
FIG. 23 is a flowchart of an exemplary process performed by a base station.
Figure 24:
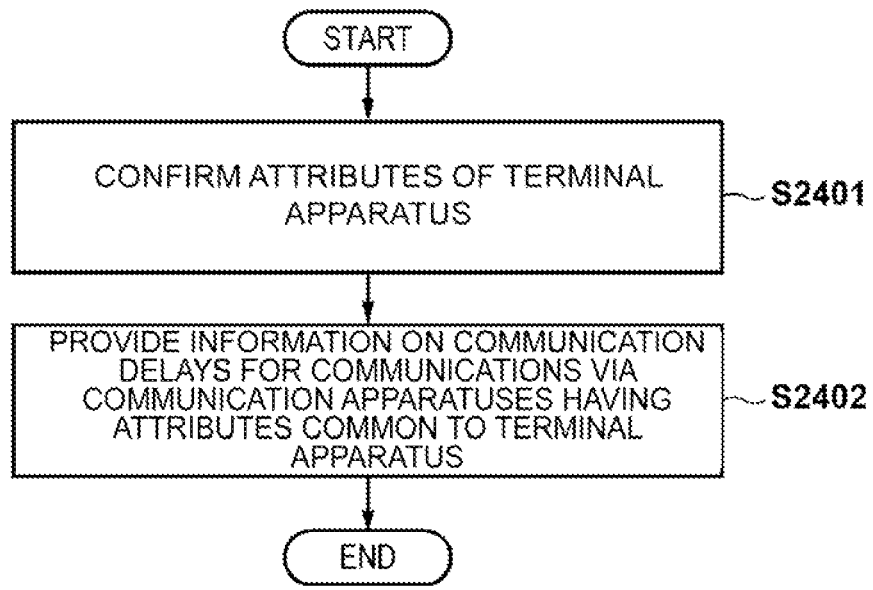
FIG. 24 is a flowchart of an exemplary process performed by a base station.

Note that the base station may confirm attributes of the terminal apparatus (the type of terminal apparatus and operation carried out by the terminal apparatus) and may notify the terminal apparatus of information on communication quality obtained based on past communication by communication apparatuses having the same or similar attributes as the terminal apparatus. For example, as illustrated in FIG. 23, the base station acquires the attribute information on a communication apparatus in addition to information on communication delays when collecting the information on communication delays in communications of the communication apparatus (S2301, S2302), then stores the attributes of the communication apparatus and communication delays in association with each other (S2303). Note that, when the base station collects communication delays for communication of other communication apparatuses having common attributes, the base station adds newly collected communication delays to the information on communication delays held corresponding to the common attributes or updates the information on the newly collected communication delays. In this way, the base station can store information on communication delays for each attribute of the communication apparatus. The base station may provide information associated with the attributes and communication delays to other base stations or a network node (S2304). As a result, each base station can store not only information that associates the attributes of the communication apparatus that it has communicated with in the past with the communication delay information, but also information that associates the attributes of the communication apparatus that has communicated with other base stations in the past with the communication delay information. As illustrated in FIG. 24, when providing information to the terminal apparatus, the base station confirms attributes of the terminal apparatus (S2401), and then extracts information on communication delays held in association with the attributes of the terminal apparatus and provides the extracted information to the terminal apparatus (S2402). As a result, the terminal apparatus can acquire information based on actual measured communication delays in communication which a communication apparatus having attributes common to the terminal apparatus itself has carried out in the past.

The determination of whether the base station provides information to the terminal apparatus or the aspect in which the information is provided, as described above, may be carried out by a network node, such as an MME, rather than the base station. In this case, the base station may provide information on communication delays in a particular aspect, for example, to a particular terminal apparatus, in accordance with instructions from the network node. According to such an aspect, the configuration of the base station can be simplified. On the other hand, by the base station carrying out such determination, the time from determination to provision of information can be shortened and unnecessary signaling can be reduced, allowing information to be efficiently provided to the terminal apparatus.

As described above, according to the present embodiment, by the base station providing information on communication delays to the terminal apparatus, the terminal apparatus can carry out processing such as handover to an appropriate base station in accordance with the communication delays.

Note that, in the present embodiment, although it has been described that information on actual measured communication delays of the base station in accordance with the cellular communication standard is provided for the terminal apparatus, the terminal apparatus may acquire information on the actual measured communication delay for other communication apparatuses such as the access point of a wireless LAN. That is, the terminal apparatus may acquire information on actual measured communication delays regarding at least a portion of the communication path to a communication partner apparatus (operator apparatus) in the event it is assumed that the terminal apparatus is connected to any other apparatus capable of communicating with the communication standard supported by the terminal apparatus itself. Thus, the base station described above may be replaced as the apparatus corresponding to the base station in other communication standards, such as the access point of the wireless LAN. The terminal apparatus may carry out control such as connecting to the access point of a wireless LAN, if necessary, based on, for example, information on the actual measured communication delay of the wireless LAN. In one example, using a scheme such as an LWA (LTE WLAN aggregation) in which a cellular base station cooperates with the access point of the wireless LAN to provide communication service to terminal apparatuses, the terminal apparatus may connect to the access point of the wireless LAN with a small actual measured communication delay under control of the cellular base station.

The base station of at least one of the abovementioned embodiments is characterized as including:
a notification unit for notifying a terminal apparatus of information associated with communication delays predicted for communication between the base station and the terminal apparatus.

According to this embodiment, when the terminal apparatus connects to the base station and communicates with the partner apparatus, the terminal apparatus can recognize to what extent a communication delay occurs and carry out the appropriate processing according to the results of this recognition. That is, when the predicted communication delay is long, the terminal apparatus may carry out a process that can be continued even if the communication delay is long, while when the predicted communication delay is short, the terminal apparatus may carry out a process assuming that the communication delay is short.

Furthermore, the base station is characterized in that:
the information on the communication delays is based on an actual measured communication delay in communication carried out in the past by the base station.

According to this embodiment, the terminal apparatus can specify the value of the communication delay obtained in communication when connected to the base station in the actual communication environment. As a result, the terminal apparatus can carry out the appropriate processing corresponding to the actual communication environment. For example, the terminal apparatus may carry out processing to connect to a base station having a small actual measured communication delay in the past.

The base station is also characterized in that:
the information on the communication delays is information indicating a statistic regarding the actual measured communication delay.

According to this embodiment, the terminal apparatus can characteristically recognize the value of the communication delay obtained in communication when connected to a base station in the actual communication environment and carry out the appropriate processing according to the characteristic. For example, even if the average value of the communication delay is small, it cannot be said that a base station having a large dispersion can stably carry out communication. For this reason, the terminal apparatus, for example, can carry out processing according to characteristics, such as connecting to a base station having a small dispersion even if the average value of the communication delay is relatively large.

The base station is also characterized in that:
the information on the communication delays is information indicating a value based on the maximum value of the actual measured communication delay.

According to this embodiment, the terminal apparatus can estimate the maximum value of the communication delay obtained in communication when connected to a base station in the actual communication environment. Thus, the terminal apparatus may carry out the appropriate processing based on the estimated maximum communication delay. For example, the terminal apparatus may select a base station whose maximum communication delay is smaller than the required delay and carry out processing to connect to the base station.

The base station is also characterized in that:
the information on the communication delays is based on the actual measured communication delay in communication carried out by other communication apparatuses having common attributes with the terminal apparatus, among communications carried out in the past at the base station.

According to this embodiment, it is possible to provide information on the appropriate communication delay for each attribute of the terminal apparatus.

The base station is also characterized in that:
the information on communication delays is information on a communication delay in at least a portion of a communication path of communication between the terminal apparatus and a communication partner apparatus of the terminal apparatus.

According to this embodiment, the terminal apparatus can recognize to what extent a communication delay is expected when communicating with a particular communication partner apparatus.

The base station is also characterized in that:
the notification unit notifies the terminal apparatus of the information on the communication delay via a broadcast signal.

According to this embodiment, it is possible to provide information to a terminal apparatus not in a connected state with the base station. For this reason, the terminal apparatus can ascertain the communication delay when it is assumed that communication is carried out in connection with the base station before establishing a connection with the base station. As a result, the terminal apparatus can prevent the establishment of a connection with a base station having a long communication delay when stable communication is required.

The base station is also characterized in that:
the notification unit, in addition to the information on the communication delay, notifies the terminal apparatus of information indicating the position of the base station.

According to this embodiment, when the terminal apparatus connects to the base station and communicates with the partner apparatus, the terminal apparatus can recognize to what extent a communication delay occurs or the possibility of a future handover and carry out the appropriate processing according to the results of this recognition. That is, when the communication delay is long and/or the distance between the terminal apparatus itself and the base station is long, the terminal apparatus can carry out a process that can be continued even if the communication quality deteriorates, while when the communication delay is short and the distance between the terminal apparatus itself and the base station is short, the terminal apparatus can carry out a process assuming that the communication quality is stable.

The base station is also characterized in that: the information indicating the position of the base station includes information on a height of the position in which the base station is installed.

According to this embodiment, when base stations and terminal apparatuses may be present at different positions in the height direction, such as in a building, the terminal apparatus can be connected to the base station installed at the height corresponding to the height of the terminal apparatus itself. As a result, it is possible to prevent a situation in which the wireless quality suddenly deteriorates and a handover is required due to the terminal apparatus connecting to a base station that does not correspond to the height.

The base station is also characterized in that: the notification unit notifies the terminal apparatus of information that, when the terminal apparatus communicates via the base station, associates the position of the terminal apparatus with the communication delays predicted in the communication.

According to this embodiment, when the terminal apparatus connects to the base station and communicates with the partner apparatus at the current or future predicted position of the terminal apparatus itself, the terminal apparatus can recognize to what extent a communication delay occurs and carry out the appropriate processing according to the results of this recognition. That is, when the predicted communication delay is long, the terminal apparatus may carry out a process that can be continued even if the communication delay is long, while when the predicted communication delay is short, the terminal apparatus may carry out a process assuming that the communication delay is short. Further, the terminal apparatus may determine which base station to connect during moving, based on information on communication delays at each of one or more positions included in the scheduled route. For example, the terminal apparatus may select a base station of a connection destination or a handover destination so as to connect with a base station having a communication delay that satisfies the required delay in the scheduled route. Further, at this time, the terminal apparatus can select the base station of the connection destination so that a handover is less likely to occur. For example, the terminal apparatus may select a base station with the longest section in which the communication delay satisfies the required delay as the base station of the connection destination, rather than selecting a base station with a minimum communication delay in the scheduled route. As a result, the terminal apparatus can continue to connect to the base station satisfying the request delay without unnecessarily carrying out a handover.

The base station is also characterized by: further including an acquisition unit that acquires, in a communication carried out in the past by the base station, the position of a communication apparatus connected to the base station and carrying out communication, and an actual measured communication delay in the communication, wherein the notification unit is configured to, based on information acquired by the acquisition unit, notify the terminal apparatus of information that associates the position of the terminal apparatus with the communication delays.

According to this embodiment, the base station can collect, in the actual communication environment, values of the communication delay obtained in the communication when the terminal apparatus is connected to the base station, then provide the terminal apparatus with information corresponding to the collected values. As a result, the terminal apparatus can carry out the appropriate processing corresponding to the actual communication environment. For example, the terminal apparatus may carry out processing to connect to a base station having the small value of the actual measured communication delay in the past.

The base station is also characterized in that: the acquisition unit acquires the position of the communication apparatus and the actual measured communication delay for positions included in a predetermined area.

According to this embodiment, it is possible to prevent the waste of wireless resources, computing resources, and storage capacity of storage media due to the collection of unnecessarily large amounts of information and efficiently collect information, then appropriately provide the information to the terminal apparatus.

The base station is characterized in that: for positions included in the predetermined area, the notification unit notifies the terminal apparatus of information that associates the position of the terminal apparatus with the communication delay, while for positions not included in the predetermined area, the notification unit notifies the terminal apparatus of only the information on the communication delay.

According to this embodiment, by providing information only on positions in the required area, it is possible to prevent the amount of information notified by the base station from becoming excessive.

The base station is also characterized in that: the position of the terminal apparatus includes information on the height at which the terminal apparatus is located.

According to this embodiment, when terminal apparatuses may be present at different positions in the height direction, such as in a building, the terminal apparatus can be connected to the base station with a sufficiently small communication delay at the height of the terminal apparatus itself. As a result, it is possible to prevent a situation in which the wireless quality suddenly deteriorates and a handover is required due to the terminal apparatus connecting to a base station that does not correspond to the height of the terminal apparatus. In addition, the terminal apparatus can carry out the appropriate processing such as reducing the processing accuracy so as to be capable of withstanding long communication delays based on, for example, the predicted communication delay obtained at the height of the terminal apparatus itself.

The base station is also characterized in that: the information on height includes information indicating a height of an intersection that intersects in three dimensions.

According to this embodiment, for example, when a terminal apparatus provided in a vehicle carrying out remote operation or automatic operation based on communication enters the three-dimensional intersection, the terminal apparatus can be prevented from connecting to base stations corresponding to heights different from the heights of the three-dimensional intersection in which the terminal apparatus itself exists, thereby allowing the terminal apparatus to be connected to an appropriate base station.

As a result, it is possible to maintain appropriate operating control of the vehicle. In addition, when the terminal apparatus provided in the vehicle carrying out remote operation or automatic operation based on communication enters the three-dimensional intersection, the terminal apparatus can acquire information on the communication delays corresponding to the height of the three-dimensional intersection in which the terminal apparatus itself exists. As a result, the terminal apparatus, for example, can be prevented from connecting to base stations corresponding to heights different from the height of the three-dimensional intersection in which the terminal apparatus itself is located, thereby allowing the terminal apparatus to be connected to an appropriate base station. As a result, it is possible to maintain appropriate operating control of the vehicle.

The base station is also characterized in that: the notification unit notifies the terminal apparatus of the information on communication delays when the terminal apparatus is a predetermined type of terminal apparatus.

According to this embodiment, by notifying information on the communication delays only for the predetermined type of terminal apparatus requiring the information on the communication delays, it is possible to prevent the occurrence of unnecessary communication, such as providing information to a terminal apparatus that does not require the information.

The base station is also characterized in that: the notification unit notifies the terminal apparatus of the information on the communication delay when the terminal apparatus is in a state of carrying out a predetermined operation.

According to this embodiment, by notifying the information on the communication delays only to the terminal apparatus carrying out the predetermined operation that requires the information on the communication delays, it is possible to prevent the occurrence of unnecessary communication, such as providing information to a terminal apparatus that does not require the information.

The base station is also characterized in that: the notification unit notifies the terminal apparatus of information on the communication delay in an aspect in accordance with attributes of the terminal apparatus.

According to this embodiment, when the characteristics of the communication delays required for each attribute of the terminal apparatuses are different, information on an aspect suitable for the attributes can be provided.

The communication system of at least one of the embodiments described herein is characterized by: a communication system including a base station and a terminal apparatus, wherein the base station includes a communication delay notification unit for notifying the terminal apparatus of information on communication delays predicted for communication between the base station and the terminal apparatus, and the terminal apparatus has an information acquisition unit for acquiring the information on the communication delays from the base station.

According to this embodiment, when the terminal apparatus connects to the base station and communicates with the partner apparatus, the terminal apparatus can recognize to what extent a communication delay occurs and carry out the appropriate processing according to the results of this recognition. That is, when the predicted communication delay is long, the terminal apparatus may carry out a process that can be continued even if the communication delay is long, while when the predicted communication delay is short, the terminal apparatus may carry out a process assuming that the communication delay is short.

The communication method of the abovementioned embodiment is characterized by: the communication method carried out by a base station, including: notifying a terminal apparatus of information on communication delays predicted for communication between the base station and the terminal apparatus.

According to this embodiment, when the terminal apparatus connects to the base station and communicates with the partner apparatus, the terminal apparatus can recognize to what extent a communication delay occurs and carry out the appropriate processing according to the results of this recognition. That is, when the predicted communication delay is long, the terminal apparatus may carry out a process that can be continued even if the communication delay is long, while when the predicted communication delay is short, the terminal apparatus may carry out a process assuming that the communication delay is short.

The program of the abovementioned embodiment is characterized by: causing a computer provided in a base station to: notify a terminal apparatus of information, which is information on communication delays predicted for communication between the base station and the terminal apparatus.

According to this embodiment, when the terminal apparatus connects to the base station and communicates with the partner apparatus, the terminal apparatus can recognize to what extent a communication delay occurs and carry out the appropriate processing according to the results of this recognition. That is, when the predicted communication delay is long, the terminal apparatus may carry out a process that can be continued even if the communication delay is long, while when the predicted communication delay is short, the terminal apparatus may carry out a process assuming that the communication delay is short.

The present disclosure is not limited to the embodiments described above, with various modifications and alterations capable of being made within the scope of the present disclosure.

What is claimed is:

1. A base station, comprising:
   a memory for storing computer readable code; and
   a processor operatively coupled to the memory, the processor configured to:
   notify a terminal apparatus of information associated with communication delays predicted for communication between the base station and the terminal apparatus, wherein the information associated with the communication delays is based at least partially on actual measured communication delays in communication carried out by other terminal apparatuses having common attributes with the terminal apparatus, among communications carried out in the past at the base station.

2. The base station according to claim 1, wherein the information associated with the communication delays includes information indicating statistics regarding the actual measured communication delay.

3. The base station according to claim 1, wherein the information associated with the communication delays includes information indicating a value based on the maximum value of the actual measured communication delay.

4. The base station according to claim 1, wherein the information associated with the communication delays includes information associated with communication delays in at least a portion of the communication path of communication between the terminal apparatus and a communication partner apparatus of the terminal apparatus.

5. The base station according to claim 1, wherein the processor, operatively coupled to the memory, is further configured to notify the terminal apparatus of information associated with the communication delay via a broadcast signal.

6. The base station according to claim 1, wherein the processor, operatively coupled to the memory, is further configured to notify the terminal apparatus of information indicating a position of the base station.

7. The base station according to claim 6, wherein the information indicating the position of the base station includes information on a height of the position in which the base station is installed.

8. The base station according to claim 1, wherein the processor, operatively coupled to the memory, is further configured to notify the terminal apparatus of information that, when the terminal apparatus communicates with the base station, associates a position of the terminal apparatus with the communication delays predicted in the communication.

9. The base station according to claim 8, wherein the processor, operatively coupled to the memory, is further configured to:
  acquire, in a communication carried out in the past by the base station, a position of a communication apparatus connected to the base station and an actual measured communication delay in the communication; and
  notify the terminal apparatus of information that associates the position of the terminal apparatus with the communication delay.

10. The base station according to claim 9, wherein the processor, operatively coupled to the memory, is further configured to acquire the position of the communication apparatus and the actual measured communication delay for positions included in a predetermined area.

11. The base station according to claim 10, wherein, for positions included in the predetermined area, the processor is configured to notify the terminal apparatus of information that associates the position of the terminal apparatus with the communication delay, while for positions not included in the predetermined area, the processor is configured to notify the terminal apparatus of only the information associated with the communication delay.

12. The base station according to claim 8, wherein the position of the terminal apparatus includes information associated with the height at which the terminal apparatus is located.

13. The base station according to claim 12, wherein the information associated with the height includes information indicating a height in an intersection that intersects in three dimensions.

14. The base station according to claim 1, wherein the processor is configured to notify the terminal apparatus of the information associated with the communication delay when the terminal apparatus is a predetermined type of terminal apparatus.

15. The base station according to claim 1, wherein the processor is configured to notify the terminal apparatus of the information associated with the communication delay when the terminal apparatus is in a state of carrying out a predetermined operation.

16. A communication system including a base station and a terminal apparatus, wherein:
  the base station is configured to transmit a notification signal to the terminal apparatus, the notification signal including information on communication delays predicted for communication between the base station and the terminal apparatus, wherein the information on the communication delays is based at least partially on actual measured communication delays in communication carried out by other terminal apparatuses having common attributes with the terminal apparatus, among communications carried out in the past at the base station, and
  the terminal apparatus is configured to receive the information on the communication delays from the base station.

17. A computer-implemented communication method performed by a base station, comprising:
  notifying a terminal apparatus of information associated with a communication delay predicted for communication between the base station and the terminal apparatus, wherein the information associated with the communication delay is based at least partially on actual measured communication delays in communication carried out by other terminal apparatuses having common attributes with the terminal apparatus, among communications carried out in the past at the base station.

18. The computer-implemented communication method according to claim 17, further comprising:
  receiving a request for information associated with communication delays from the terminal apparatus;
  collecting information associated with communication delays from at least one of the terminal apparatus and other base stations; and
  transmitting, to the terminal apparatus, the information associated with communication delays.

* * * * *